(12) United States Patent
Matsuda

(10) Patent No.: US 7,595,811 B2
(45) Date of Patent: *Sep. 29, 2009

(54) ENVIRONMENT-COMPLAINT IMAGE DISPLAY SYSTEM, PROJECTOR, AND PROGRAM

(75) Inventor: Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/201,775

(22) Filed: Jul. 25, 2002

(65) Prior Publication Data

US 2003/0020725 A1 Jan. 30, 2003

Related U.S. Application Data

(63) Continuation-in-part of application No. 09/916,678, filed on Jul. 30, 2001, now Pat. No. 6,847,374.

(30) Foreign Application Priority Data

Jul. 26, 2001 (JP) ............................. 2001-226416

(51) Int. Cl.
G09G 5/10 (2006.01)
(52) U.S. Cl. .................. 345/690; 345/617; 345/207
(58) Field of Classification Search ......... 345/589–590, 345/600, 74.1, 77, 89, 101, 207, 690
See application file for complete search history.

(56) References Cited

U.S. PATENT DOCUMENTS

| 4,952,917 | A | | 8/1990 | Yabuuchi | |
|---|---|---|---|---|---|
| 5,115,229 | A | * | 5/1992 | Shalit | 345/2.2 |
| 5,298,892 | A | * | 3/1994 | Shapiro et al. | 345/88 |
| 5,488,434 | A | | 1/1996 | Jung | |
| 5,526,285 | A | * | 6/1996 | Campo et al. | 356/405 |
| 5,555,022 | A | * | 9/1996 | Haruki et al. | 348/223.1 |
| 5,642,172 | A | * | 6/1997 | Yoon et al. | 348/603 |
| 5,754,682 | A | * | 5/1998 | Katoh | 382/162 |
| 5,757,438 | A | * | 5/1998 | Yoon et al. | 348/603 |
| 5,760,843 | A | | 6/1998 | Morimura et al. | |
| 5,952,992 | A | * | 9/1999 | Helms | 345/102 |
| 5,956,004 | A | * | 9/1999 | Hush et al. | 345/74 |
| 5,956,015 | A | * | 9/1999 | Hino | 345/600 |

(Continued)

FOREIGN PATENT DOCUMENTS

EP 0 700 218 A 3/1996

(Continued)

OTHER PUBLICATIONS

U.S. Appl. No. 09/916,677, filed Jul. 30, 2001, Matsuda.

*Primary Examiner*—Kee M Tung
*Assistant Examiner*—David H Chu
(74) *Attorney, Agent, or Firm*—Oliff & Berridge, PLC

(57) ABSTRACT

An environment-compliant image display system, projector, and program that enables the reproduction of appropriate colors even when affected by ambient light. The projector has a color control processing update section that corrects colors by adjusting a LUT in a 3D-LUT storage section and brightness by adjusting a grayscale characteristic in a ID-LUT storage section, in order to increase the output in at least a lower grayscale range if the environment is affected by ambient light, based on environmental information that has been measured by a color light sensor.

8 Claims, 19 Drawing Sheets

U.S. PATENT DOCUMENTS

| | | | |
|---|---|---|---|
| 6,043,797 A * | 3/2000 | Clifton et al. | 345/589 |
| 6,236,474 B1 * | 5/2001 | Mestha et al. | 358/520 |
| 6,240,204 B1 * | 5/2001 | Hidaka et al. | 382/167 |
| 6,297,859 B1 * | 10/2001 | George | 348/747 |
| 6,480,202 B1 * | 11/2002 | Deguchi et al. | 345/600 |
| 6,538,814 B2 * | 3/2003 | Hunter et al. | 359/449 |
| 6,628,822 B1 | 9/2003 | Nakabayashi et al. | |
| 6,636,229 B2 * | 10/2003 | Ishikawa et al. | 345/590 |
| 7,046,843 B2 * | 5/2006 | Kanai | 382/167 |
| 2002/0130820 A1 * | 9/2002 | Sullivan | 345/6 |
| 2002/0159039 A1 * | 10/2002 | Yoneno | 353/85 |
| 2002/0171637 A1 * | 11/2002 | Kadowaki et al. | 345/204 |

FOREIGN PATENT DOCUMENTS

| | | |
|---|---|---|
| EP | 1 079 605 A2 | 2/2001 |
| GB | 2 335 326 A | 9/1999 |
| GB | 2 341 033 A | 3/2000 |
| JP | 58-573 | 1/1983 |
| JP | A-59-066280 | 4/1984 |
| JP | A 3-74969 | 3/1991 |
| JP | 04-053374 | 2/1992 |
| JP | A-04-127667 | 4/1992 |
| JP | A-04-136925 | 5/1992 |
| JP | A-05-100652 | 4/1993 |
| JP | A-07-095558 | 4/1995 |
| JP | A-09-018806 | 1/1997 |
| JP | A 9-107484 | 4/1997 |
| JP | A-09-149337 | 6/1997 |
| JP | A 9-190170 | 7/1997 |
| JP | A 9-197999 | 7/1997 |
| JP | A-09-219800 | 8/1997 |
| JP | 10-062865 | 3/1998 |
| JP | A 10-70653 | 3/1998 |
| JP | A 10-105145 | 4/1998 |
| JP | A-10-173944 | 6/1998 |
| JP | A 10-304395 | 11/1998 |
| JP | 10-334218 | 12/1998 |
| JP | A-11-032228 | 2/1999 |
| JP | A 11-85952 | 3/1999 |
| JP | A 11-146232 | 5/1999 |
| JP | A 11-234539 | 8/1999 |
| JP | A-2001-060082 | 3/2001 |
| WO | WO94/18790 | 8/1994 |

* cited by examiner

ENVIRONMENT-COMPLAINT IMAGE DISPLAY SYSTEM, PROJECTOR, AND PROGRAM

Japanese Patent Application No. 2001-226416, filed on Jul. 26, 2001, is hereby incorporated by reference in its entirety.

BACKGROUND OF THE INVENTION

The present invention relates to an environment-compliant image display system, projector, and program.

When displaying images at a plurality of different locations (in presentations, meetings, medical treatments, the design or fashion world, business activities, commercials, education, as well as general-purpose images such as those in movies, TV, video, and games), an important part of achieving effective presentation is to make it possible to reproduce images exactly as the creator of those images intended, whatever the location.

One way of considering how to adjust the image appearance is management of the input-output characteristics of the device to achieve color management in the reproduction of colors. Specific methods of how to achieve this are not, however, clear.

When projecting and displaying an image with a projector and screen, in particular, it is difficult to reproduce colors in a suitable manner without considering not only ambient light but also the screen type.

Recent advances in increasing resolution of projectors have made color reproducibility important as well.

Particularly if the environment is affected by ambient light such as artificial light, a state can occur in which the chroma values of the colors are adversely affected by the brightness, making it impossible to reproduce colors appropriately.

BRIEF SUMMARY OF THE INVENTION

The present invention was devised in the light of the above-described technical problem and it may provide an environment-compliant image display system, projector, and program that make it possible to reproduce suitable colors, even in an environment that is affected by ambient light.

(1) In order to solve the above described technical problem, a first aspect of the present invention provides an environment-compliant image display system which corrects an image, based on environmental information that expresses a viewing environment in a display area in which the image is displayed, and displays the image, the image display system comprising:

correction means for correcting input-output characteristic data for display that is used by image display means which displays the image, in such a manner as to increase an output value in at least a lower grayscale range, or a lower input signal value range, when the environment is affected by ambient light, based on the environmental information.

(2) A second aspect of the present invention provides an environment-compliant image display system which corrects an image, based on environmental information that expresses a viewing environment in a display area in which the image is displayed, and displays the image, the image display system comprising:

a correction section which corrects input-output characteristic data for display that is used by an image display section which displays the image, in such a manner as to increase an output value in at least a lower grayscale range when the environment is affected by ambient light, based on the environmental information.

(3) A third aspect of the present invention relates to a projector which corrects an image, based on environmental information that expresses a viewing environment in a display area in which the image is displayed, and displays the image, the projector comprising:

correction means for correcting input-output characteristic data for display that is used by image display means that projects the image towards the display area to display the image, in such a manner as to increase an output value in at least a lower grayscale range when the environment is affected by ambient light, based on the environmental information.

(4) A fourth aspect of the present invention relates to a projector which corrects an image, based on environmental information that expresses a viewing environment in a display area in which the image is displayed, and displays the image, the projector comprising:

correction section which corrects input-output characteristic data for display that is used by an image display section that projects the image towards the display area to display the image, in such a manner as to increase an output value in at least a lower grayscale range when the environment is affected by ambient light, based on the environmental information.

(5) A program in accordance with a fifth aspect of the present invention causes a computer which performs correction of an image for display to function as:

correction means for correcting input-output characteristic data for display that is used by image display means, based on environmental information that expresses a viewing environment in a display area in which the image is displayed, in such a manner as to increase an output value in at least a lower grayscale range when the environment is affected by ambient light.

This aspect of the invention makes it possible for an image display system or the like to reduce the deterioration of chroma and thus achieve suitable color reproduction, by increasing an output value in a lower grayscale range if the chroma of the image is adversely affected by ambient light.

In particular, when ambient light is present, the ratio of the image-creating light with respect to the sum of the ambient light and the image-creating light can easily drop more in the lower grayscale range than in the high grayscale range. This makes it possible to reduce the effects of the ambient light and reproduce colors appropriately, even when the image display system or the like is affected by ambient light.

Note that this correction means could correct the input-output characteristic data for display that is used by the image display means, in such a manner as to increase the output values over the entire grayscale range.

Note that "viewing environment" in this case refers to factors such as ambient light (artificial light, natural light, etc.) and the object on which the image is displayed (display device, wall surface, screen, etc.).

This environmental information could be values that express color and brightness, such as xyY, or color and brightness correction amounts, such as $\Delta x \Delta y \Delta Y$.

(6) in each of this image display system, projector and program, the correction means may correct the input-output characteristic data by performing a predetermined calculation using parameters that differ between a lower grayscale range and a grayscale range other than the lower grayscale range.

This makes it possible for the image display system or the like to obtain a suitable output corresponding to the grayscales, by using parameters that are different for a lower grayscale range and a grayscale range other than the low grayscale range.

In other words, an output value in a higher grayscale range would be increased too far if the same equation as used for increasing an output value in the lower grayscale range is used, and it could happen that the image will break up.

Excessive increasing of the output value can be prevented by using parameters that differ between a lower grayscale range and a grayscale range other than the lower grayscale range in accordance with the present invention, thus making it possible to reduce the likelihood of a situation such as one in which the image breaks up.

Note that the lower grayscale range corresponds to a range from a low grayscale value that in lower than an intermediate grayscale value in the entire grayscale range, to a grayscale value of zero.

In this case, a plurality of grayscale ranges could be provided as the grayscale range other than the lower grayscale range, and the correction means could correct the input-output characteristic data by performing predetermined calculations using different parameters for each of these grayscale ranges.

(7) In each of this image display system and projector, the environmental information may be information obtained by a viewing environment detection means; and the viewing environment detection means may include a luminance sensor that measures a luminance value of the display area or a color light sensor that measures ROB or XYZ values of the display area.

(8) In this program, the environmental information may be information obtained by a viewing environment detection means; and the viewing environment detection means may include a luminance sensor that measures a luminance value of the display area or a color light sensor that measures RGB or XYZ values of the display area.

If a front-projection type of display device is used as this image display device and computer, this configuration ensures that the effect of ambient light such as artificial light on the projected image depends not just on the ambient light, but also on the properties of the projection surface (such as the spectral reflectivity thereof) and projection distance. In such a case, the image display system or the like can determine an appropriate viewing environment which includes the properties of the projection surface and the distance to the projection surface, by using the luminance value and RBG or XYZ values that reflect the luminance value, to determine the viewing environment, rather than using illumination intensity as the environmental information.

Note that the image display system may comprise the above viewing environment detection means.

(9) Each of the image display system and projector may further comprise:

the image display means for displaying an image to prompt a user to input the type of screen having the display area; and input means for inputting the screen type input by the user as at least part of the environmental information.

(10) The program may cause the computer to further function as:

the image display means for displaying an image to prompt a user to input the type of screen; and input means for inputting the screen type input by the user as at least part of the environmental information.

This enables the image display system or the like to correct the brightness and colors of the image as appropriate, by considering the screen not be considered in the prior art as a factor of the viewing environment.

In particular, since there is only a small number of screen types and people can easily distinguish between them, there is little likelihood of a decision error during input of this screen type and thus it is possible to determine the screen type accurately.

Note that this screen could be of a reflective type or a transmission type.

(11) In each of this image display system, projector and program, the correction means may correct the input-output characteristic data by performing a predetermined calculation based on a difference between a brightness value for the actual environment included in the environmental information and a brightness value for an ideal environment.

This enables the image display system or the like to easily determine how much correction to apply to the input-output characteristic data, from the difference between the brightness value of the actual environment and the brightness value of an ideal environment (such as $\Delta Y$). This enables the image display system or the like to rapidly obtain corrections to the input-output characteristic data.

Note that the actual environment in this case refers to the environment in which the image display system is used in practice, which is affected by external factors such as ambient light, and the ideal environment is a hypothetical usage environment that is determined beforehand. The brightness value refers to a value that expresses brightness in units such as candela per square meter ($cd/m^2$) or lux (lx).

(12) in each of this image display system, projector and program, the correction means may perform gamma correction as at least part of the correction of the input-output characteristic data.

This enables the image display system or the like to increase the output in the lower grayscale range, by reducing the gamma value thereof if the output in the lower grayscale range has been adversely affected by the effects of ambient light, for example. This makes it possible to reduce the effects of the ambient light and reproduce colors appropriately, even when the image display system or the like is affected by ambient light.

Note that if the gamma correction amount is $\Delta \gamma$ in this case, the equation that is used for these calculations during gamma correction could be: $\Delta \gamma = -h\alpha(\gamma - \gamma min)/(1 + |h\alpha|)$.

In this case, h is an adjustment parameter (or it could be a constant), $\alpha$ is the environmental information for brightness correction obtained by the viewing environment detection means, and $\gamma min$ is the minimum value of $\gamma$ used as data for conversion control. This $\gamma min$ is used for adjusting the values of the above equation so as to lie within a suitable range.

This makes it possible to correct the image automatically in accordance with the viewing environment, by determining the viewing environment and correcting the image continuously.

(13) In each of this image display system, projector and program, the correction means may correct color modification information that is stored in a predetermined storage area, in such a manner that a color temperature of the image to be displayed is adjusted, based on the brightness value for the actual environment included in the environmental information.

This enables the image display system or the like to reproduce the colors of the image suitably, by adjusting the color temperatures in accordance with the brightness of external factors such as the actual ambient light.

(14) In each of this image display system, projector and program, the color modification information may be a three-dimensional look-up table.

In the prior art, a one-dimensional look-up table (1D-LUT) is used with the objective of providing refinements such as color temperature adjustment, gamma correction, and correction of the characteristics of the display elements.

To achieve high-quality color management, however, it is necessary to aim for consistency of reproducible color gamuts between other display devices having different reproducible color gamuts and a standard color space (sRGB, for example).

It is also necessary to match the reproducible color gamut of a display device that has been affected by its environment with the reproducible color gamut of other display devices or the standard color space. To achieve such matching of the reproducible color gamut, corrections called color compression and color expansion are applied.

When it comes to matching two reproducible color gamuts, some parts of one reproducible color gamut are likely to fall outside the other reproducible color gamut, while other parts of the first reproducible color gamut are within the other reproducible color gamut. For that reason, the image display system or the like must perform corrections that apply compression to areas of a specific color or expansion to areas of another specific color, within the same reproducible color gamut.

It is difficult to implement such color control over specific areas by using 1D-LUTs to control the gamma values of each RGB color. Even though a 1D-LUT is a mapping table, it can only be used for controlling primary colors and it is difficult to apply different levels of control for each color. On the other hand, a three-dimensional look-up table (3D-LUT) makes it possible to control each color, even if it is not a primary color, which enables variable control (color compression and color expansion) for each area of color as those described above.

By using a 3D-LUT as color modification information, the image display system or the like can control features such as variable color compression and color expansion for each area of color, which is difficult with a 1D-LUT, thus enabling accurate color reproduction.

With this image display system, projector, and program, the correction means could correct a gamma table that is at least part of the one-dimensional look-up table, as the gamma correction.

With this image display system and program, the display area could be an area on a screen.

This image display system can be applied in a satisfactory manner even when the color appearance is greatly changed by materials such as the screen.

The viewing environment detection means could determine the viewing environment in a manner that reflects the type of the screen.

For example, the viewing environment detection means could comprise a sensor that determines a screen characteristic.

More specifically, the image display system or the like could determine the characteristic of the screen by using a sensor such as a color light sensor to measure the reflected light (or transmitted light) when white light or light in primary colors such as R, G, and B light is projected thereon.

According to the above features, the image display device absorbs difference in screen type, by determining a viewing environment and implementing gamma correction and color temperature correction based on the determined viewing environment. This makes it possible for the image display system to reproduce substantially the same colors whatever the type of screen is.

With a PC or the like that uses an OS with internal color management system in accordance with the prior art, in particular, only the type of display connected to the PC is considered. There have been proposals for correcting the colors from consideration of the ambient light, but there is nothing that considers the screen that forms the display area for the image.

The present invention makes it possible for the image display system or the like to generate an image for display that reflects the viewing environment as appropriate, by determining the viewing environment including the type of screen and correcting the colors accordingly.

With this image display system, the viewing environment detection means could also comprise means for measuring at least ambient light, to determine the viewing environment.

With this program, the viewing environment detection means could determine the viewing environment from consideration of at least the ambient light.

This enables the image display system or the like to measure ambient light and determine the viewing environment. Within the viewing environment, ambient light has a large effect on the image appearance. An image display system or the like can determine the viewing environment in a suitable manner by measuring the ambient light that has a major effect on the image appearance.

DETAILED DESCRIPTION OF THE EMBODIMENT

The description below relates to a case in which the present invention is applied to an image display system which uses a liquid-crystal projector and which can adapt to the environment, by way of example, with reference to the accompanying figures.

Description of Overall System

Figure 1:
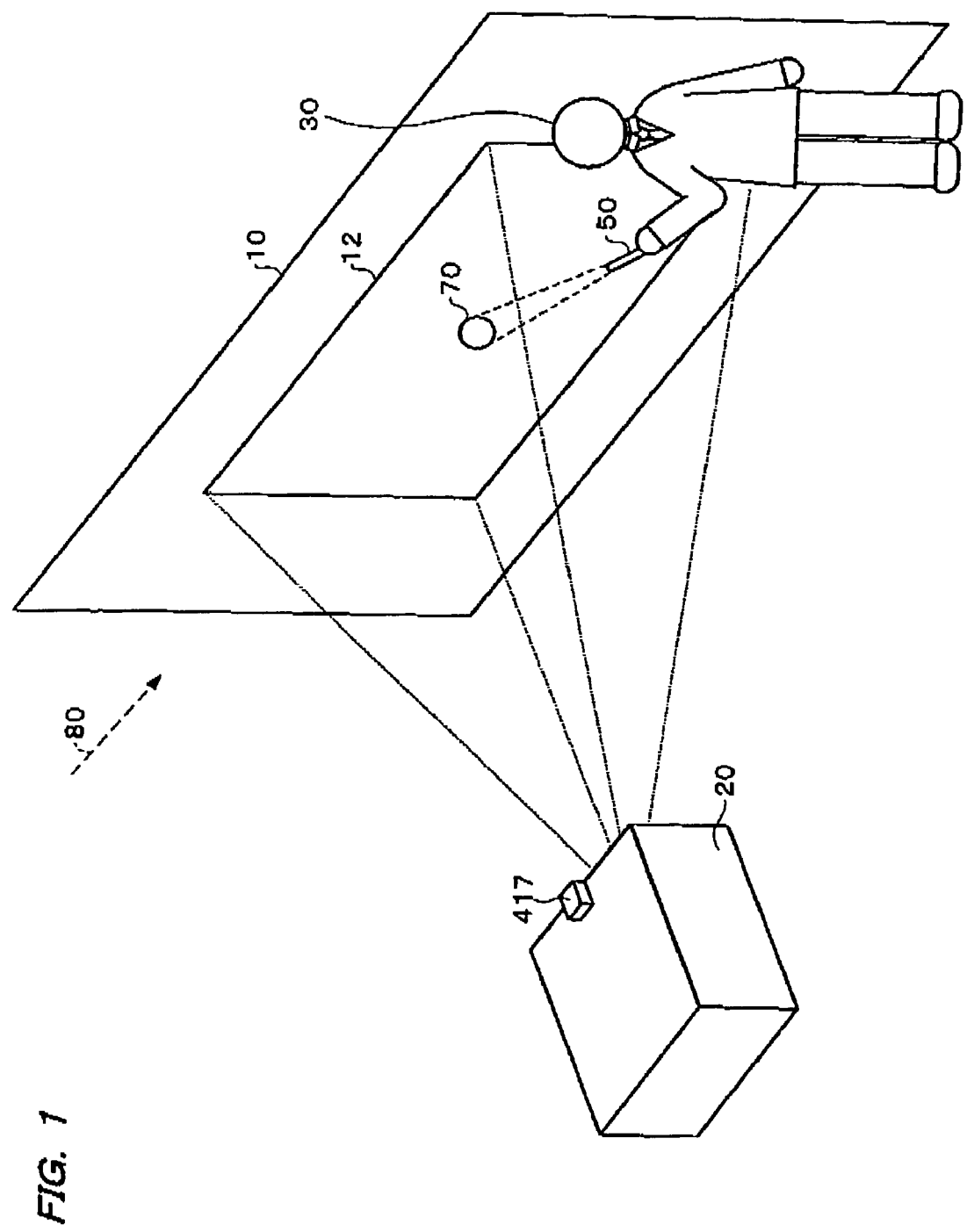
FIG. 1 is a schematic illustrative view of an image display system in accordance with one embodiment of the present invention.

A schematic illustrative view shown in FIG. 1 is of an image display system in accordance with one embodiment of the present invention.

A projector 20 that is provided substantially facing a screen 10 projects an image for a predetermined presentation. A presenter 30 gives a presentation to an audience, while using a light spot 70 projected from the laser pointer 50 to point at a desired position of an image in an image display region 12, which is a display area on the screen.

During such a presentation, the image appearance on the image display region 12 will vary greatly, depending on factors such as the type of the screen 10 and ambient light 80. When the same white is displayed, for example, it could seem to be white with a yellow cast or white with a blue cast, depending on the type of the screen 10. Even when the same white is displayed, it could seem to be a bright white or a dull white if the ambient light 80 differs.

Recently, the projector 20 has become smaller and easy to transport. For that reason, it has become possible to perform presentations at a client's location, by way of example, but it is difficult to adjust colors to match the environment at the client's location and the manual adjustment of colors at the client's location takes too much time.

Figure 2:
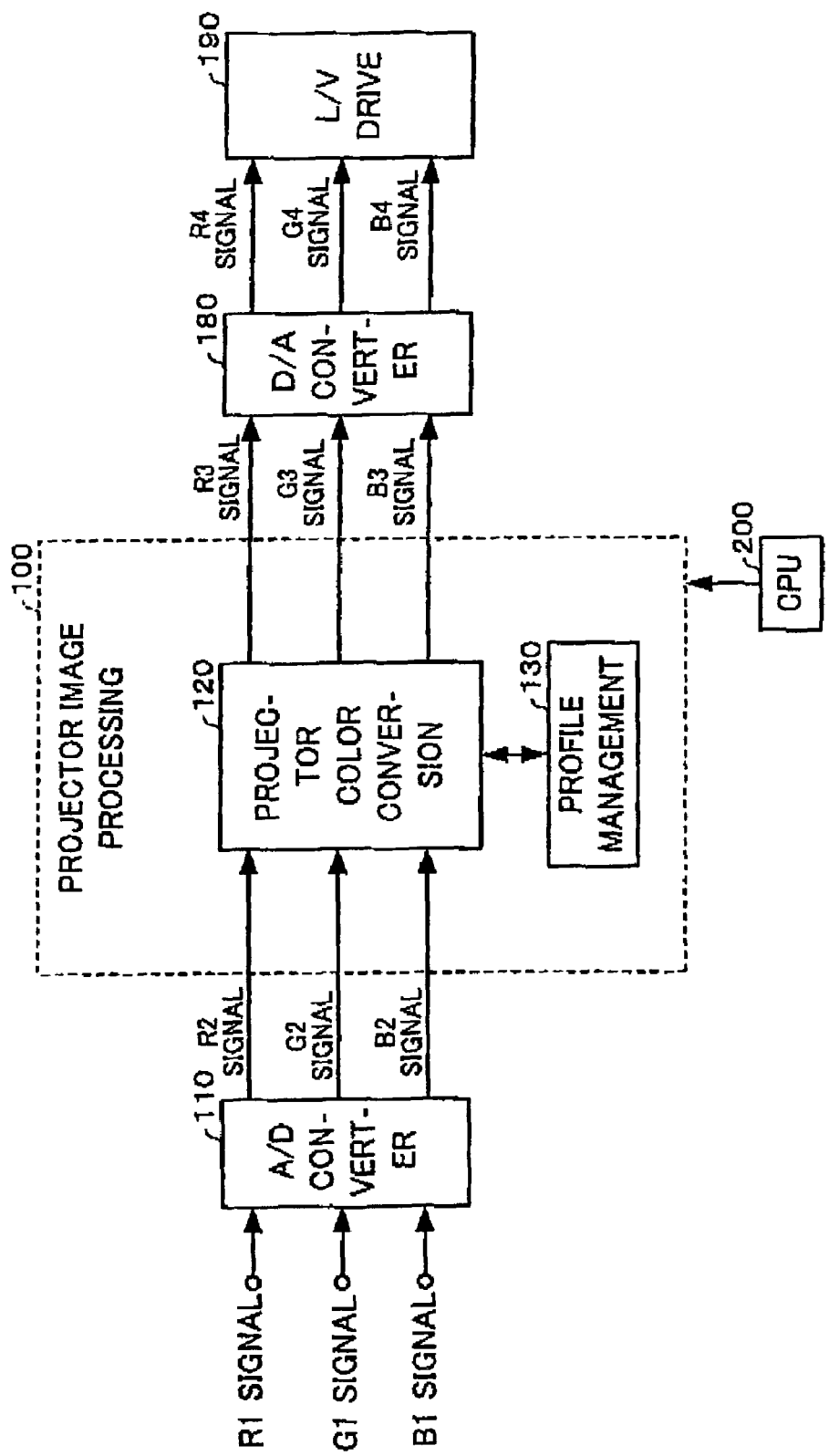
FIG. 2 is a functional block diagram of the image processing section within a prior-art projector.

A functional block diagram of the image processing section within a prior-art projector is shown in FIG. 2.

This prior-art projector inputs an R1 signal, a G1 signal, and a B1 signal (which form RGB signals in analog format, sent from a PC or the like) to an A/D converter section 110, and uses a projector image processing section 100 to perform color modification on an R2 signal, a G2 signal, and a B2 signal.

The projector then inputs an R3 signal, a G3 signal, and a B3 signal, which have been subjected to color modification, to a D/A converter section 180; inputs an R4 signal, a G4 Signal, and a B4 signal that have been converted into analog form to a light valve (L/V) drive section 190; and displays an image by driving liquid crystal light valves.

The projector image processing section 100, which is controlled by a CPU 200, comprises a projector color conversion section 120 and a profile management section 130.

The projector color conversion section 120 converts the RGB digital signals (the R2 signal, G2 signal, and B2 signal) from the A/D converter section 110 into RGB digital signals for projector output (the R3 signal, G3 signal, and B3 signal), based on a projector input-output profile that is managed by the profile management section 130. Note that "profile" in this case refers to characteristic data.

In this manner, the prior-art projector can only perform color modification based on an input-output profile that indicates input-output characteristics that are specific to that particular projector, so no consideration is paid to the viewing environment in which the image is projected and displayed.

However, it is difficult to ensure that the color appearance is uniform in this manner, without taking the viewing environment into account. The color appearance is determined by three factors: light, the reflection or transmission of light by objects, and vision.

This embodiment of the present invention implements an image display system that can reproduce an image with the same visual appearance, by determining the viewing environment of light and the reflection or transmission of light by objects, irrespective of the environment in which it is applied.

More specifically, the device is provided with a color light sensor 417 that functions as viewing environment detection means for determining the viewing environment, as shown in FIG. 1, and environmental information from the color light sensor 417 is input to the projector 20. To be even more specific, the color light sensor 417 measures color light information (more specifically, information indicating xyY colors and brightness) of the image display region 12 within the screen 10.

The projector 20 is provided with color control processing means having a storage area for storing color correction information and brightness correction information that is one type of input-output characteristic data for display that is used by a means for displaying an image, and correction means for updating the color correction information and brightness correction information, based on environmental information from the color light sensor 417.

The description now turns to the function blocks of the image processing section of the projector 20, which comprises this color control processing means and this correction means.

Figure 3:
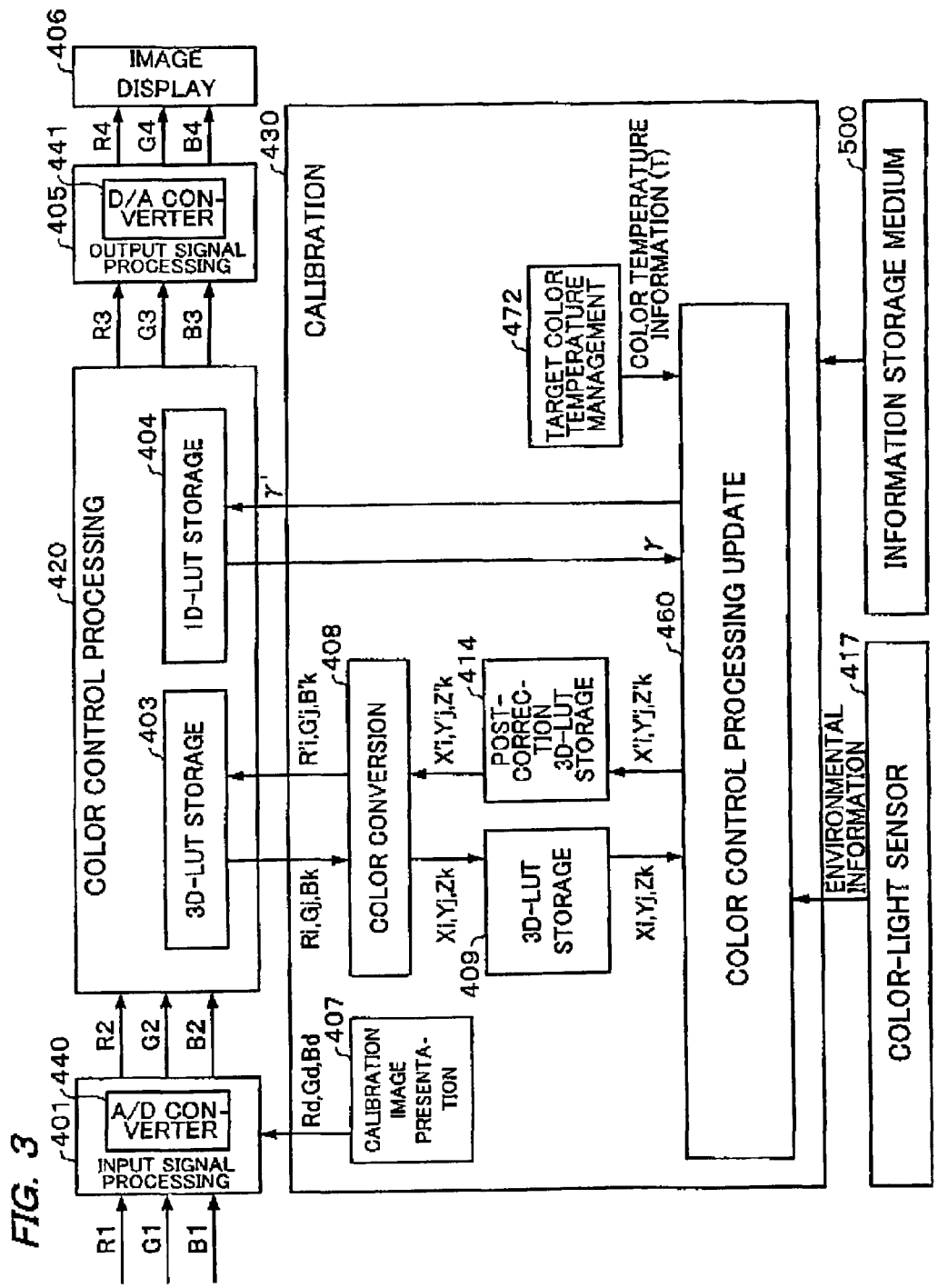
FIG. 3 is a functional block diagram of the image processing section within a projector in accordance with one embodiment of the present invention.
Figure 18:
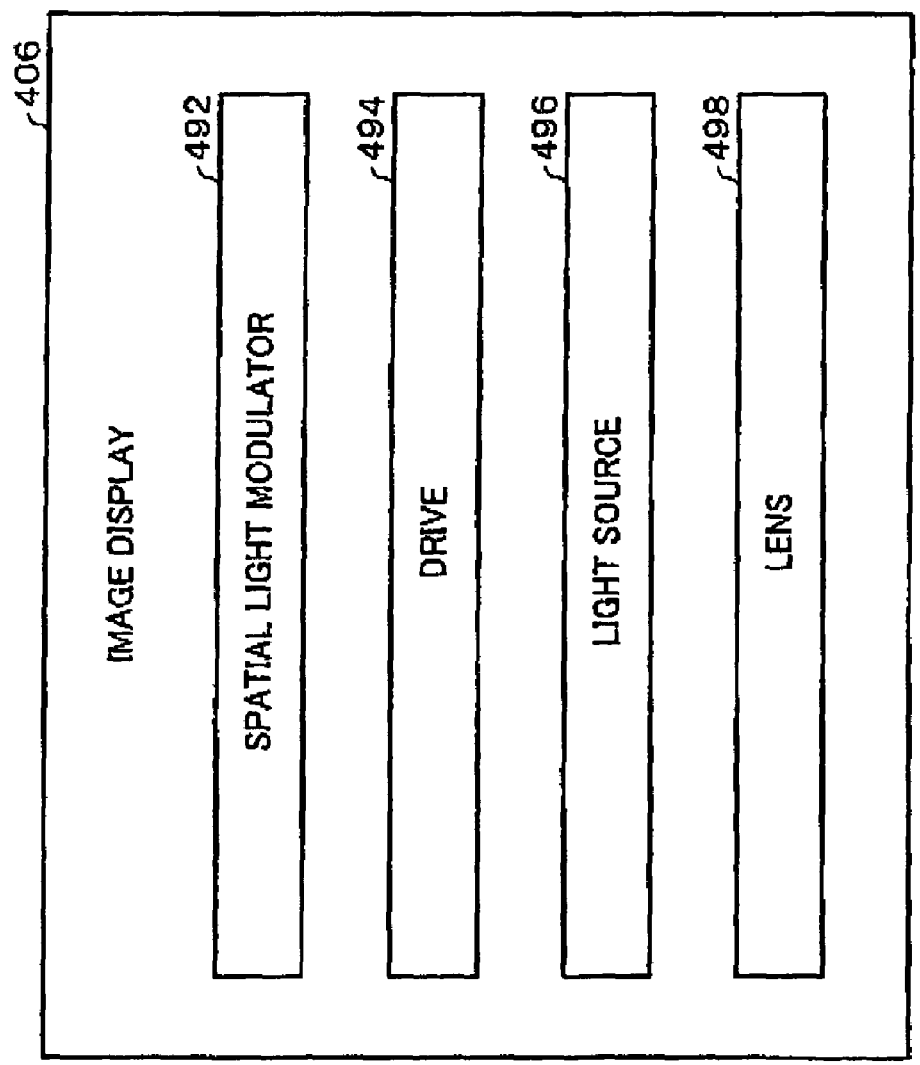
FIG. 18 is a block diagram showing the image display section in accordance with one embodiment of the present invention.

A functional block diagram of the image processing section within the projector 20 in accordance with one embodiment of the invention is shown in FIG. 3. FIG. 18 is a block diagram showing an image display section 406 in accordance with one embodiment of the present invention.

The image processing section comprises an input signal processing section 401 to which RGB signals are input, a color control processing section 420, a calibration section 430 that functions as correction means, an output signal processing section 405, and the image display section 406.

The input signal processing section 401 has an A/D converter section 440 that converts the R1, G1, and B1 analog image signals into the R2, G2, and B2 digital image signals.

The image display section 406 includes; a spatial light modulator 492; a drive section 494 which drives the spatial light modulator 492 based on the R4, G4 and B4 signals from the output signal processing section 405; a light source 496 which emits light toward the spatial light modulator 492; and a lens 498 which projects light modulated by the spatial light modulator 492.

The color control processing section 420 comprises a three-dimensional look-up table (3D-LUT) storage section 403 that is used in correcting the color information and a 1D-LUT storage section 404 that is used in correcting the brightness information.

Note that a gamma table and color balance table (or just one of them) are stored as part of the brightness correction information in the 1D-LUT storage section 404. Similarly, a color-gamut correction table and a color temperature correction table (or just one of them) are stored as part of the color correction information in the 3D-LUT storage section 403.

With a prior-art projector, color control is done with a 1D-LUT and brightness correction is done by determining what potential is used when sampling the input signal.

During the correction of the brightness of colors to be reproduced, it is necessary for the projector 20 to increase the output value in a lower grayscale range, or a lower input signal value range. In this case, the projector 20 performs brightness correction by using a 1D-LUT that can manipulate a grayscale characteristic.

As previously described, the projector 20 of this embodiment of the invention uses a 3D-LUT to perform color correction, since the application of color compression and color expansion differs for each color, when it comes to matching another reproducible color gamut by color control.

In this manner, the projector 20 can correct brightness and color separately, based on environmental information relating to brightness and environmental information relating to color, making it possible to perform each type of correction more precisely.

With this embodiment of the present invention, the projector 20 updates the γ values of a gamma correction table within the 1D-LUT storage section 404 to increase the output for the entire grayscale range when the environment is affected by ambient light, to reduce deterioration of the chroma values of the colors. This makes it possible to reproduce colors in substantially the same manner as that when the environment is not affected by ambient light. Since the lower grayscale range is particularly likely to be affected by ambient light, in comparison with the higher grayscale range, the projector 20 is made to be capable of reproducing colors in substantially the same manner as that when the environment is not affected by ambient light, by correcting the grayscale characteristic in such a manner as to increase the output in at least the lower grayscale range.

The description now turns to color correction, which will be followed by a description of brightness correction.

Color Correction

The calibration section 430 comprises a calibration image presentation section 407 which inputs image signals for calibration (correction) to the input signal processing section 401, a color conversion section 408 which converts colors for conversion (stored in the 3D-LUT storage section 403) from the RGB color system into the XYZ color system, and a color control processing update section 460 which performs color and brightness correction update, based on environmental information that is input from the color light sensor 417.

Note that the RGB system results in device-dependent colors that vary with the input-output device, such as a projector, but the XYZ system results in device-independent colors.

The color information stored in RGB format in the 3D-LUT storage section 403 (Ri, Gj, and Bk, where i, j, and k are integers in this document; in other words, the color information is managed in a plurality of grayscales) is output to the color conversion section 408 and is converted into color information (Xi, Yj, Zk).

The color conversion section 408 temporarily stores that color information (Xi, Yj, Zk) in a 3D-LUT storage section 409 and outputs it to the color control processing update section 460.

The color control processing update section 460 converts the color information (Xi, Yj, Zk) stored in the 3D-LUT storage section 409, based on environmental information from the color light sensor 417.

The color light sensor 417 functions as a viewing environment detection means that determines the viewing environment. The color light sensor 417 could be one or a combination of several different devices, such as a luminance sensor that measures the luminance value of the display area or a color light sensor (such as three luminance sensors) that measures the RGB values or XYZ values of the display area.

The effect of a viewing environment such as artificial light on the projected image depends not just on the ambient light, but also on the properties of the projection surface (such as the spectral reflectance thereof) and projection distance. In such a case, the projector 20 can determine an appropriate viewing environment by including the properties of the projection surface and the distance to the projection surface, rather than using illumination intensity as the environmental information, by employing the color light sensor 417 that uses the luminance value. RBG or XYZ values that reflect the luminance value, to determine the viewing environment.

This environmental information is environmental information for color correction update and environmental information for brightness correction update.

In this case, the environmental information for color correction update could be information such as white-light chromaticity of the illumination, chromaticity correction request information (such as a color difference or chromaticity difference), color phase, color temperature change request information, or the correlated color temperature of the illumination, by way of example.

Similarly, the environmental information for brightness correction could be brightness (luminance) of the illumination, image signal brightness correction request information (such as ΔY), image output adjustment information, image contrast, or contrast correction request information, by way of example.

Note that information that combines environmental information for color correction and environmental information for brightness correction update (in a form such as xyY) could also be used as the environmental information.

The calibration section 430 comprises a target color temperature management section 472 for managing the color temperature of the reproduced image.

Color temperature information (T) is output from the target color temperature management section 472 to the color control processing update section 460. In this case, the color temperature information (T) corresponds specifically to the target color temperature, the target correlated color temperature, the chroma of the target color temperature, target correlated color temperature, or the chroma of the target correlated color temperature, by way of example.

It is difficult for generic projector to accurately reproduce the color temperature taken as a target, such as a target color temperature, when affected by artificial light or the like. In such a case, the color control processing update section 460 produces color information (X'i, Y'j, Z'k) that is based on environmental information, in such a manner that an image of color temperature T is reproduced in a state that is adversely affected by artificial light in practice, by outputting an image in such a manner that a color temperature T' is obtained from consideration of the effects of the artificial light.

The color control processing update section 460 outputs the thus-obtained tri-stimulus values (X'i, Y'j, Z'k) to a post-correction 3D-LUT storage section 414.

The color conversion section 408 converts the (X'i, Y'j, Z'k) values in the post-correction 3D-LUT storage section 414 into (R'i, G'j, B'k) values, then outputs the converted (R'i, G'j, B'k) values to the 3D-LUT storage section 403.

The 3D-LUT storage section 403 uses (R'i, G'j, B'k) to overwrite the color information at the destination in the 3D-LUT.

The projector 20 is therefore capable of reproducing suitable colors corresponding to the viewing environment, by overwriting the color information in the 3D-LUT of the 3D-LUT storage section 403, based on the viewing environment.

Brightness Correction

The description now turns to brightness correction.

This brightness correction is done by the color control processing update section 460 updating the grayscale characteristic in the 1D-LUT stored in the 1D-LUT storage section 404.

More specifically, the color control processing update section 460 uses the following equations to obtain the amount of correction $\Delta\gamma$ for $\gamma$ and $\gamma'$ after update:

$$\Delta\gamma = -h\alpha(\gamma - \gamma\min)/(1 + |h\alpha|)$$

$$\gamma' = \gamma + \Delta\gamma$$

Note that in this case, h is an adjustment parameter (or it could be a constant), $\alpha$ is the previously described environmental information for brightness correction, and $\gamma\min$ is the minimum value of $\gamma$ used as data for conversion control.

More specifically, if the luminance value obtained by measurement of the color of an image for grayscale correction of zero grayscales in an ideal environment is L01, the luminance value obtained by measurement of the color of an image for grayscale correction of 96 grayscales in the ideal environment is L02, C0=L02/L01, the luminance value obtained by measurement of the color of an image for grayscale correction of zero grayscales in the actual environment is L11, the luminance value obtained by measurement of the color of an image for grayscale correction of 96 grayscales in the actual environment is L12, and C1=L12/L11, then C0/C1−1 could be used as $\alpha$, by way of example.

This $\gamma\min$ is used for adjusting the values of the above equations so as to lie within a suitable range.

The description now turns to a specific example of obtaining $\Delta\gamma$.

Figure 5:
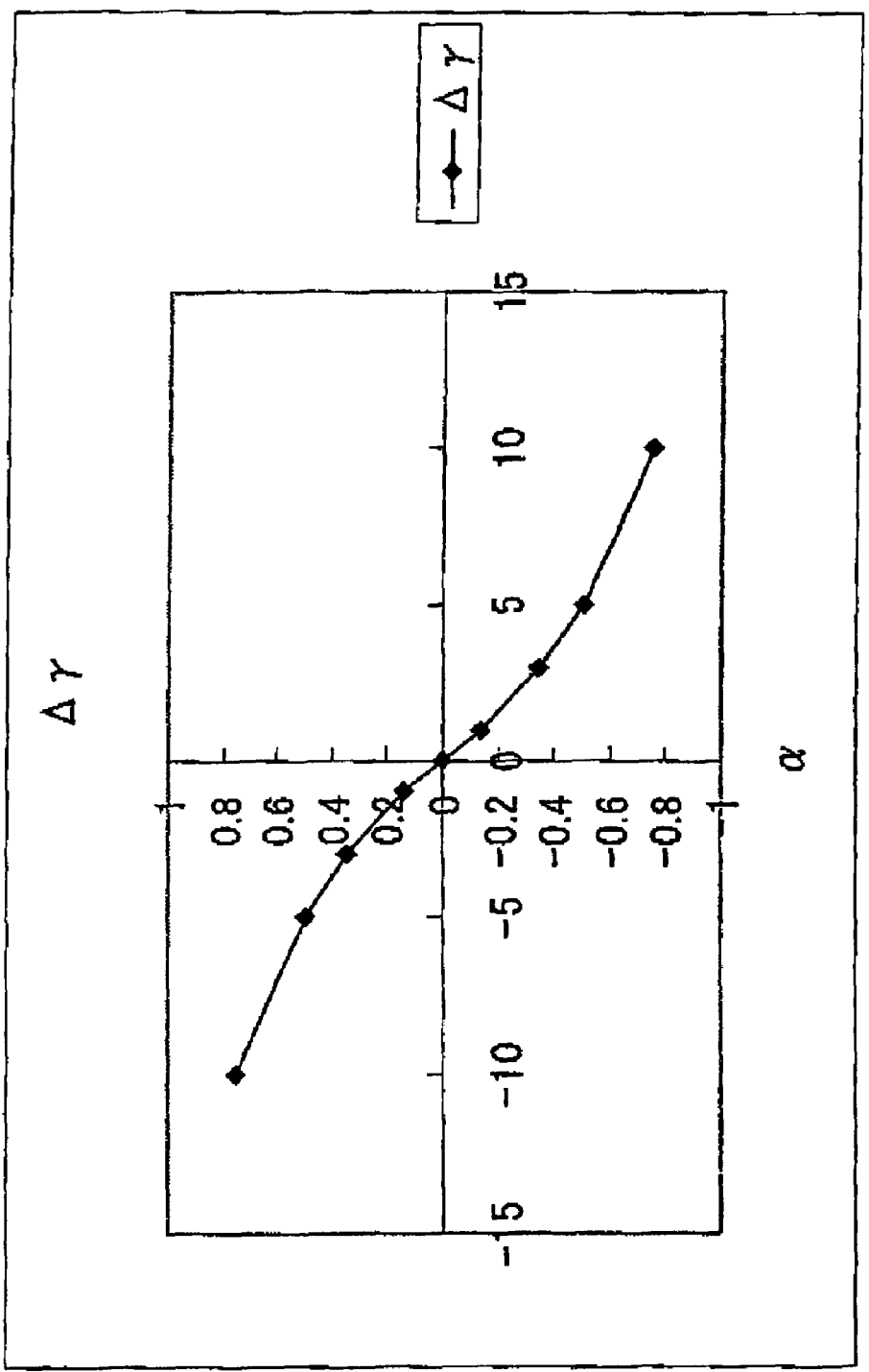
FIG. 5 shows the variation of $\Delta\gamma$ with respect to $\alpha$ in accordance with one embodiment of the present invention.
Figure 6:
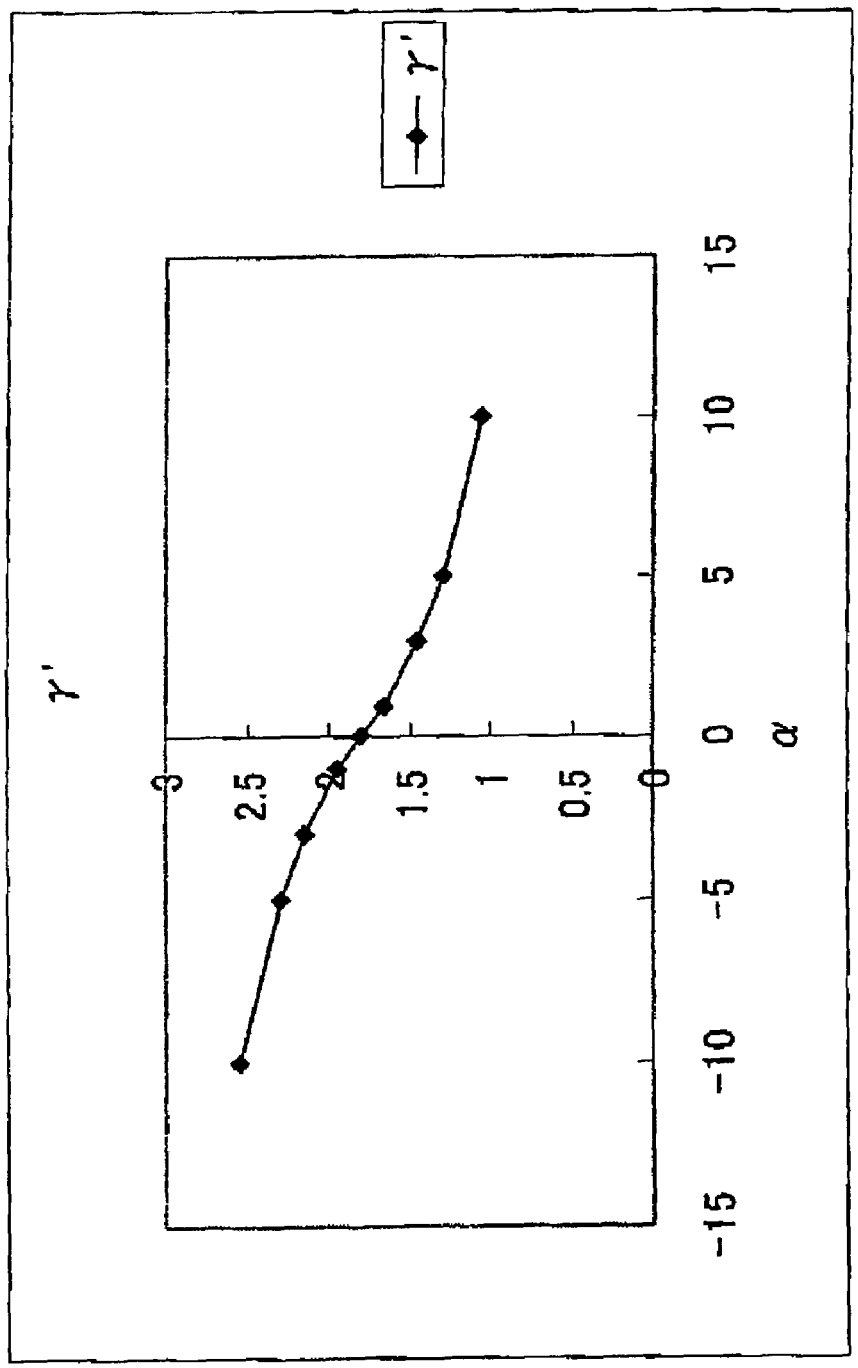
FIG. 6 shows the variation of $\gamma'$ with respect to $\alpha$ in accordance with one embodiment of the present invention.

The variation in $\Delta\gamma$ with respect to $\alpha$ in accordance with one embodiment of the present invention is shown in FIG. 5. Similarly, the variation in $\gamma'$ with respect to $\alpha$ in accordance with one embodiment of the present invention is shown in FIG. 6.

In this case, the description concerns a default $\gamma$ of 1.8, $\gamma\min$ is 0.3, and h is 0.1.

It is assumed in this case that when the value of the environmental information for brightness correction $\alpha$ is 10, in other words, when the brightness is greater than that of the viewing environment, the value of $\Delta\gamma$ is −0.75 and the value of $\gamma'$ is 1.05. That is to say, when the viewing environment is bright because of the effects of artificial light or the like, the value of $\gamma$ falls.

If the value of the environmental information for brightness correction $\alpha$ is −10, in other words, if it is darker than the standard viewing environment, the value of $\Delta\gamma$ is 0.75 and the value of $\gamma'$ is 2.55. That is to say, when the viewing environment is dark because of the effects of artificial light or the like, the value of $\gamma$ rises.

Figure 7:
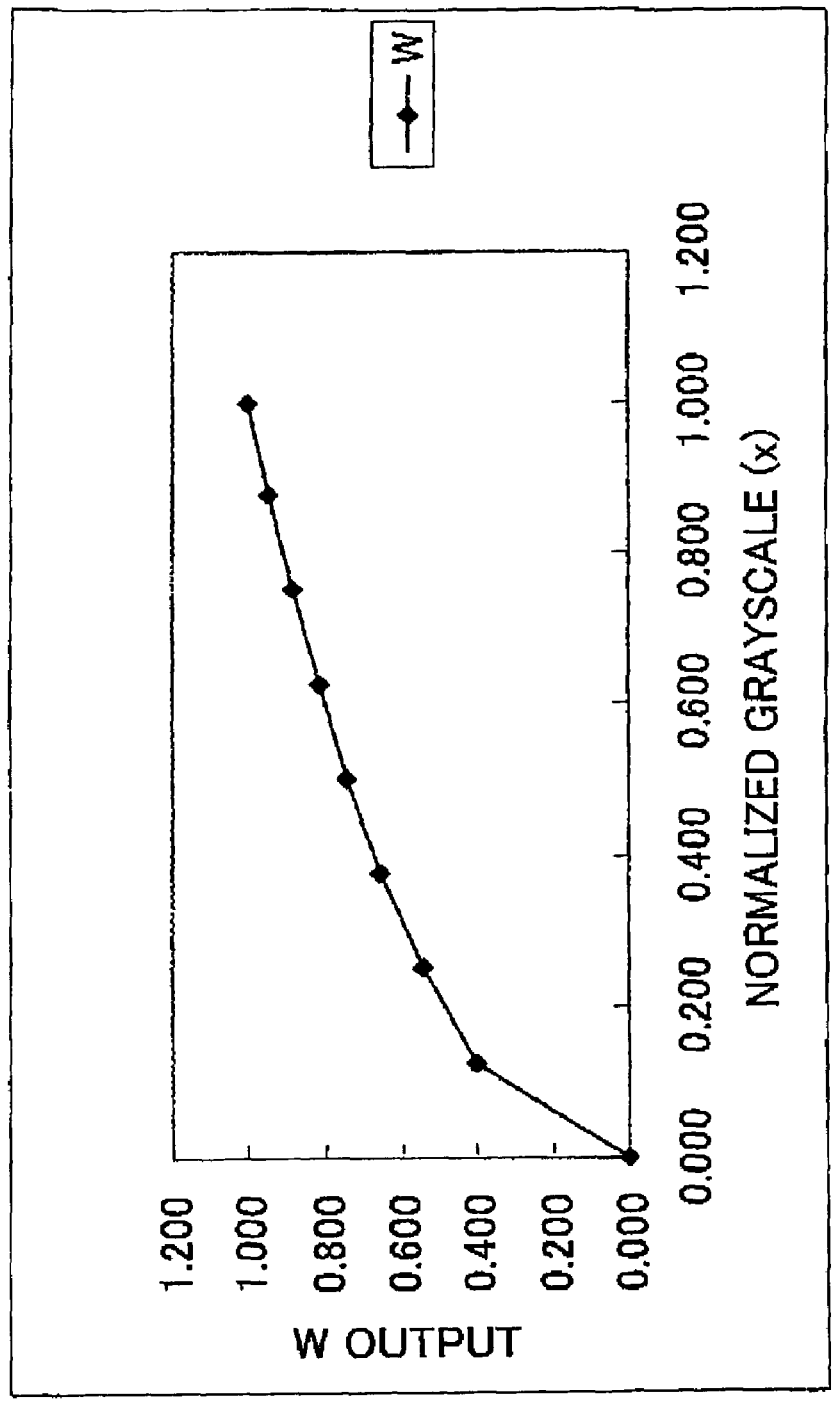
FIG. 7 shows variations in output with respect to the normalized grayscale x after $\gamma$ correction.

The variation of the output with respect to the normalized grayscale x after $\gamma$ correction is shown in FIG. 7.

FIG. 7 shows the variation in output of white light (W) when the value of $\alpha 10$ is 10, with the conditions shown in FIGS. 5 and 6.

As can be seen from FIG. 7, the output value in a lower grayscale range (such as 0.00 to 0.20) is relatively large in comparison with the output values in medium and higher grayscale ranges (such as 0.30 to 1.00).

This makes it possible to depict an image in which output is greater in the lower grayscale range, making it possible to reduce the effects of artificial light which affects the lower grayscale range in particular.

Note that the situation is similar for the RGB primary color signals; not just for white light (W).

If the $\gamma$ value is small, the projector 20 can correct for the effects of factors such as artificial light in the lower grayscale range, but if the output in the higher grayscale range is too high, the contrast is reduced and thus it can happen that the image will appear to break up.

If the $\gamma'$ values for a lower grayscale range and a grayscale range other than the lower grayscale range are made different in such a case, the projector 20 will be able to reproduce colors suitably in the lower grayscale range as well as in the grayscale range other than the lower grayscale range.

Figure 8:
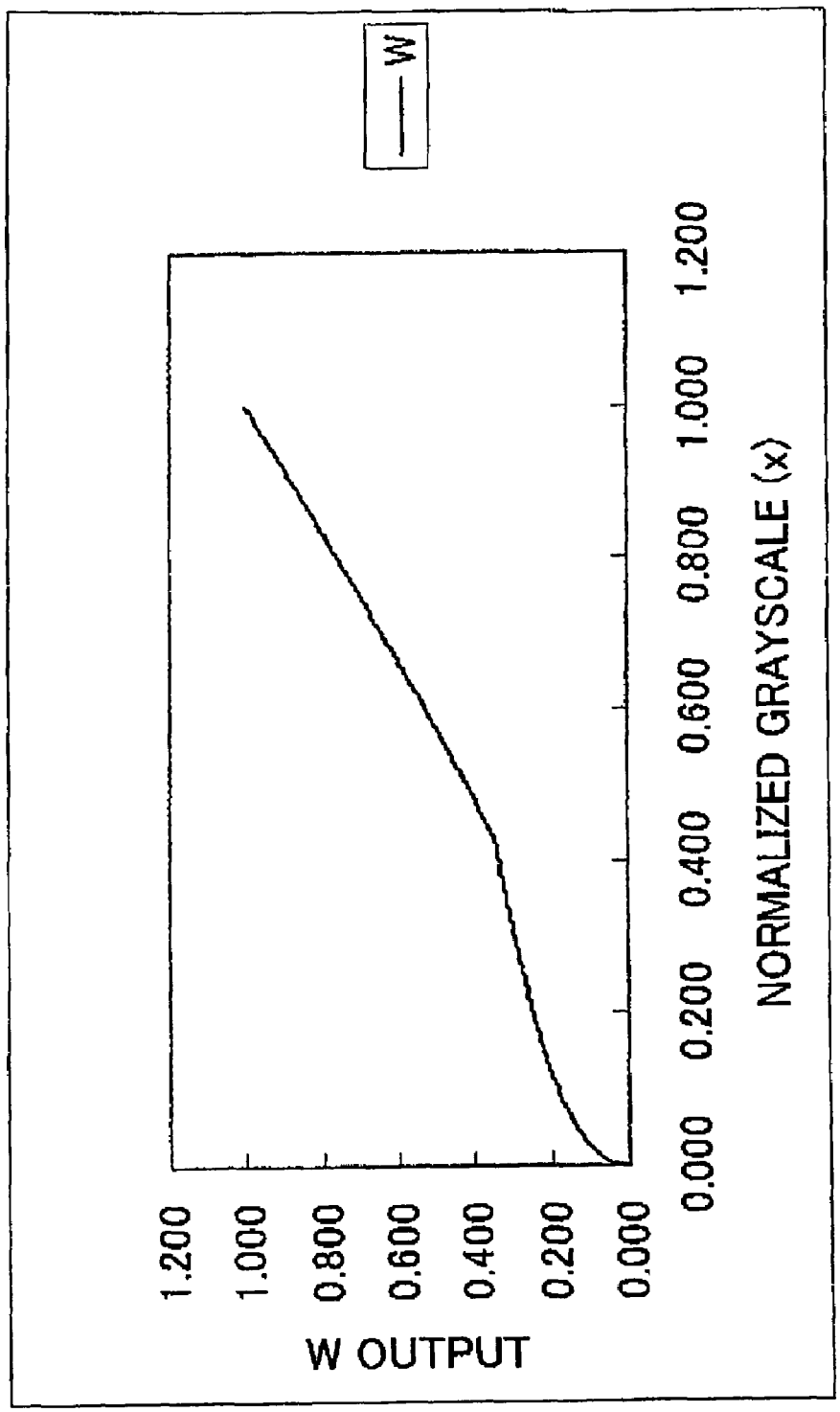
FIG. 8 shows variations in an output value when the values of $\gamma'$ are made to be different for a lower grayscale range and a grayscale range other than the lower grayscale range, in accordance with one embodiment of the present invention.

The graph of FIG. 8 shows variations in output when the values of $\gamma'$ are made to be different for a lower grayscale range and a grayscale range other than the lower grayscale range, in accordance with one embodiment of the invention. Similarly, the graph of FIG. 9 shows variations in output for a lower grayscale range and a grayscale range other than the lower grayscale range, in accordance with one embodiment of the invention.

Figure 9:
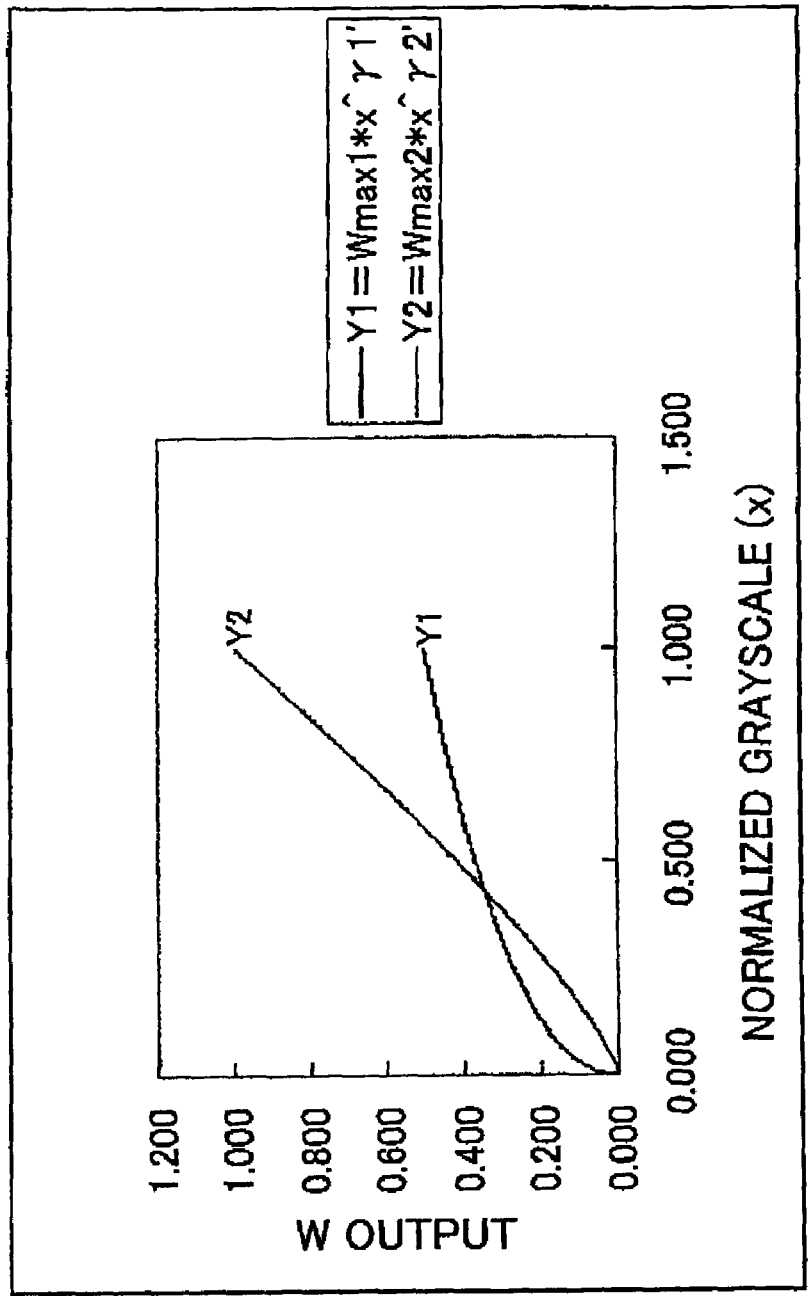
FIG. 9 shows variations in output for a lower grayscale range and variations in output for a grayscale range other than a lower grayscale range, in accordance with one embodiment of the present invention.

The output for the lower grayscale range is obtained from $Y1 = W\max1 * x^{\gamma 1'}$ and the output for the grayscale range other than the lower grayscale range is obtained by $Y2 = W\max2 * x^{\gamma 2'}$, as shown by way of example in FIG. 9. Note that the "^" symbol in this case means "raise to the power of".

In this graph, $\gamma 1'$ is the $\gamma$ value after update for the lower grayscale range and $\gamma 2'$ is the $\gamma$ value after update for the grayscale range other than the lower grayscale range. As can be seen from FIG. 9, the values are set as described below to ensure that Y1 is greater than Y2 in the lower grayscale range but less than Y2 in the higher grayscale range.

Assume that $\gamma\min1$ for the lower grayscale range is 0.3 and $\gamma\min2$ for the grayscale range other than the lower grayscale range is 1.2, by way of example, and the other values are $\alpha = 10$, $h = 1$, and the default $\gamma = 1.8$, in the same manner as described previously. Note that $\gamma\min1$ and $\gamma\min2$ are the above-described $\gamma\min$ (the minimum value of $\gamma$).

In such a case, calculations are performed using the equation for obtaining $\gamma'$, as described previously, to obtain:

$\gamma'1$ (for the lower grayscale range)=0.44

$\gamma'2$ (for the grayscale range other than the lower grayscale range)=1.25

The graph of Y1 and Y2 shown in FIG. 9 can be drawn by setting the values Wmax1=0.5 and Wmax2=1.0, by way of example.

The graph of FIG. 8 can be drawn by using Y1 for the lower grayscale range and Y2 for the grayscale range other than the lower grayscale range.

In this manner, the projector 20 can reduce break-up of the image in the higher grayscale range and thus reproduce a more suitable image, by adjusting the parameters for the lower grayscale range and the grayscale range other than the lower grayscale range.

The color control processing update section 460 updates the γ values of the 1D-LUT stored in the 1D-LUT storage section 404 with the thus-obtained γ' values.

The method of updating the 1D-LUT is described in sections (Case 1) and (Case 2) below.

(Case 1) If the 1D-LUT Data is Conversion Data Relating to Color Signals

The projector 20 of this embodiment has a 1D-LUT for each of the color signals (that is, for the R2 signal, G2 signal, and B2 signal). In other words, the 1D-LUT storage section 404 has three sets of 1D-LUT data.

The description first relates to the signal that represents the red color: the R signal.

$$R3 = k \times W\text{max1} \times \left(\frac{R2}{k}\right)^{\gamma1'} \left(\text{when } 0.00 \leq \frac{R2}{k} < 0.20\right) \quad (1)$$

$$R3 = k \times W\text{max2} \times \left(\frac{R2}{k}\right)^{\gamma2'} \left(\text{when } 0.20 \leq \frac{R2}{k} \leq 1.00\right) \quad (2)$$

In this case, k is a normalized constant. If the R2 and R3 are represented by 10-bit signals, k is 1023 (maximum value attained by the R2 and R3 signals). Wmax1 and Wmax2 are predetermined parameters.

The color control processing update section 460 links R2 and the value of R3 obtained by either Equation 1 or Equation 2 above and stores that link in memory (not shown in the figure) in the 1D-LUT storage section 404. This data in memory is equivalent to 1D-LUT data. As a result, if R2 is given as address data in this memory, the corresponding value for R3 is output. For values of R2 that are not stored in memory, a plurality of the values of R2 that are stored in memory are used in interpolation to obtain the corresponding value of R3.

The 1D-LUTs corresponding to the G2 and B2 signals are also updated in a similar manner to that for the R2 signal, using a gamma value for the lower grayscale region (γ1') and a gamma value for the higher grayscale region (γ2').

With this embodiment of the invention, the three sets of 1D-LUT data are mutually identical between R, G, and B. For that reason, the three 1D-LUTs maybe reduced to one. That would enable a saving in memory size. However, the provision of three 1D-LUTs makes it possible to include correction data for each of the R, G, and B signals (such as specific color-drift compensation). As a result, it is possible to increase the degree of freedom of color adjustment.

(Case 2) If the 1D-LUT Data is Conversion Data Relating to Luminance Values

As shown below, the luminance values expressed by the R2, G2, and B2 color signals could be varied, depending on whether they belong to a lower grayscale region or a higher grayscale region.

The luminance value L2 is based on the R2, G2, and B2 color signals as follows;

$$L2 = l \times R2 + m \times G2 + n \times B2 \quad (3)$$

In the above equation, l, m, and n are predetermined constants, such as l=0.30, m=0.59, and n=0.11.

The luminance value L2 is varied in the following manner, based on the gamma value for the lower grayscale region (γ1') or the gamma value for the higher grayscale region (γ2'):

$$L3 = k \times W\text{max1} \times \left(\frac{L2}{k}\right)^{\gamma1'} \left(\text{when } 0.00 \leq \frac{L2}{k} < 0.20\right) \quad (4)$$

$$L3 = k \times W\text{max2} \times \left(\frac{L2}{k}\right)^{\gamma2'} \left(\text{when } 0.20 \leq \frac{L2}{k} \leq 1.00\right) \quad (5)$$

In this case, k is a normalized constant. If the R2 and R3 are represented by 10-bit signals, k is 1023 (maximum value attained by the R2 and R3 signals). Wmax1 and Wmax2 are predetermined parameters.

The color control processing update section 460 links L2 and the value of L3 obtained by either Equation 4 or Equation 5 above and stores that link in memory (not shown in the figure) in the 1D-LUT storage section 404. This data in memory is equivalent to 1D-LUT data. As a result, if L2 is given as address data in this memory, the corresponding value for L3 is output. For values of L2 that are not stored in memory, a plurality of the values of L2 that are stored in memory are used in interpolation to obtain the corresponding value of L3.

The following Equations 6, 7, and 8 show how R3, G3, and B3 are obtained, based on L2 and the value of L3 read out from the 1D-LUT storage section 404:

$$R3 = \frac{L3}{L2} R2 \quad (6)$$

$$G3 = \frac{L3}{L2} G2 \quad (7)$$

$$B3 = \frac{L3}{L2} B2 \quad (8)$$

The spatial color modulator is driven on the basis of (R3, G3, B3) when the image is expressed in practice.

The above-described processing of this embodiment makes it possible to use a single 1D-LUT for correction that cancels the effects of artificial light when the luminance of the image is at a low level. Moreover, this correction does not affect the ratios of R, G, and B, either before or after. For that reason, there is no change in colors before or after this correction. In the above description of Cases 1 and 2, the lower grayscale (input signal value) range may be set to equal to or greater than 0.00 and less than 0.50, and the higher grayscale (input signal value) range may be set to be equal to or greater than 0.50 and equal to or less than 1.00.

This ensures that the projector 20 can reproduce brightness in a manner that is suitable for the viewing environment, by overwriting the 1D-LUT of the 1D-LUT storage section 404, based on the viewing environment.

The color control processing section 420 outputs to the output signal processing section 405 the image signals (R3, G3, and B3) that have been adjusted using the look-up tables (LUTs) in the 1D-LUT storage section 404 for brightness correction and the 3D-LUT storage section 403 for color correction.

The output signal processing section 405 uses a D/A converter section 441 to convert the digital image signals (R3, G3, and B3) into analog image signals (R4, G4, and B4), then outputs the converted analog image signals to the image display section 406.

The image display section 406 uses those analog image signals to drive liquid-crystal light valves to regulate the image projected from the projector 20.

In this above described manner, the projector 20 can adjust the image appearance in the image display region 12 of the screen 10 can be adjusted as appropriate by adjusting the image that it projects.

This embodiment of the present invention therefore ensures that the viewing environment is considered when an image is projected and displayed.

This makes it possible for the projector 20 to absorb differences between display environments and thus display the same image regardless of the environment to which it is applied. The projector 20 is therefore able to reproduce substantially the same colors in a plurality of different locations, within a short time.

The color light sensor 417 continuously determines the viewing environment and the color control processing update section 460 continuously obtains corrected color information and γ values, by the calculations described above. This embodiment of the present invention therefore enables the projector 20 to correct the image automatically and rapidly, from consideration of the viewing environment.

This makes it possible for the projector 20 to adjust the image accurately within a shorter time than that required when the image appearance is adjusted manually.

The projector 20 can also increase the output value in the lower grayscale range and correct the brightness of the reproduced colors by using a 1D-LUT that enables manipulation of the grayscale characteristic during the brightness correction.

The projector 20 can also apply color compression and color expansion independently for each color, by using a 3D-LUT for the color correction.

In this manner, it is possible to apply brightness correction and color correction separately, based on environmental information relating to brightness and environmental information relating to color, thus enabling the application of both types of correction more precisely.

The projector 20 can perform this correction rapidly by storing the information used for the correction in the LUT beforehand, even for the reproduction of moving images.

Specific Discussion of Effects

The description now turns to specific details of the effects of brightness and color correction, using experimental results obtained by the present inventors.

Figure 10:
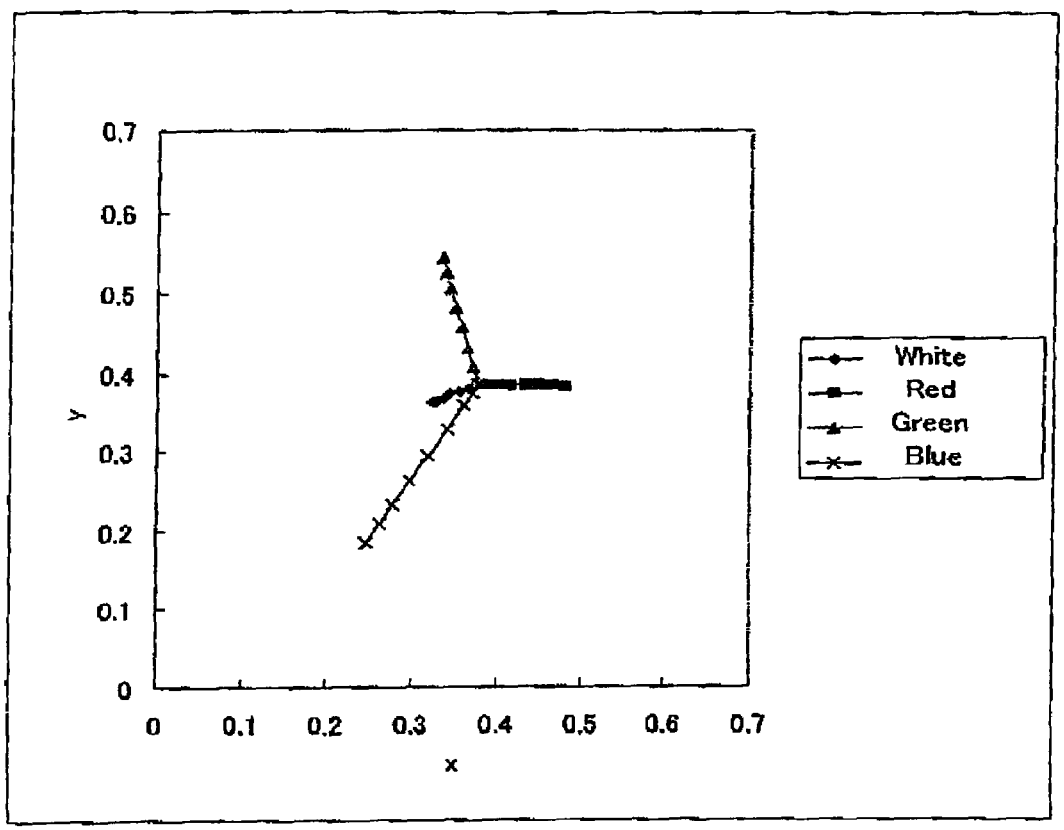
FIG. 10 shows variations in WRGB chromaticity when gray level is varied, expressed as an xy chromaticity diagram where the illuminance is approximately 600 lx and the $\gamma$ value of the projected image is 2.0.
Figure 11:
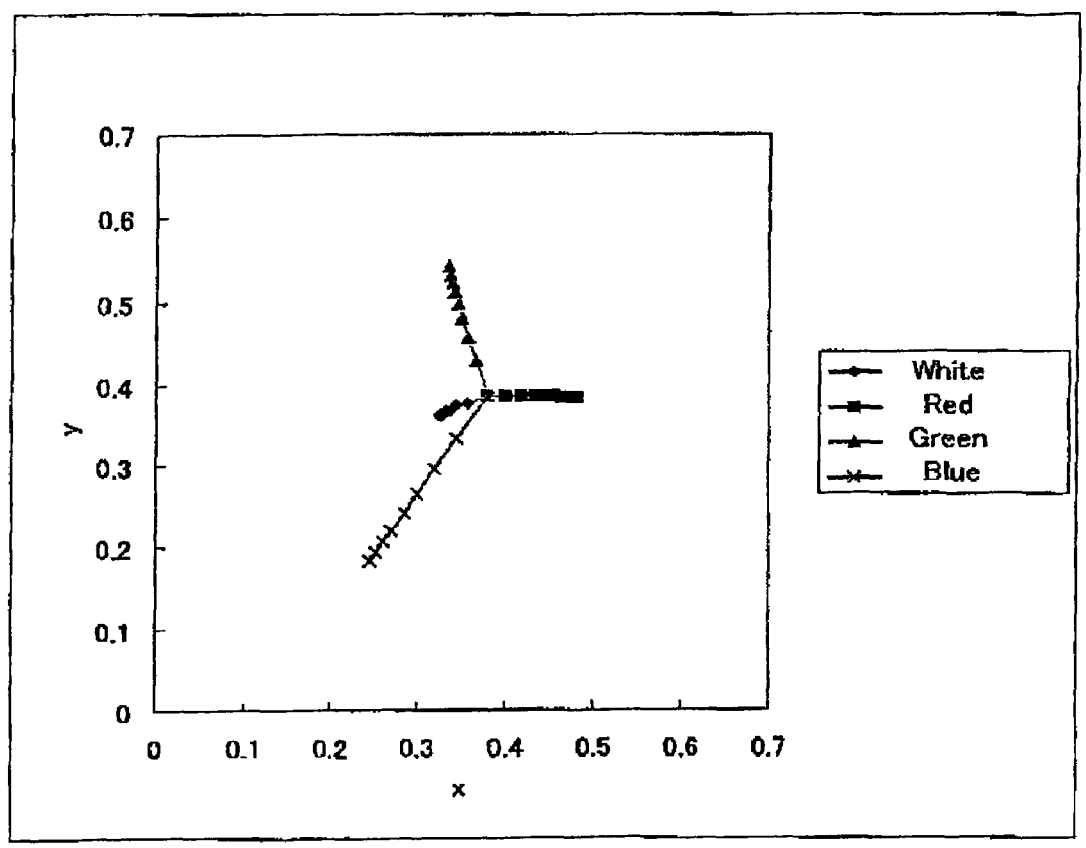
FIG. 11 shows variations in WRGB chromaticity when gray level is varied, expressed as an xy chromaticity diagram where the illuminance is approximately 600 lx and the $\gamma$ value of the projected image is 1.0.
Figure 12:
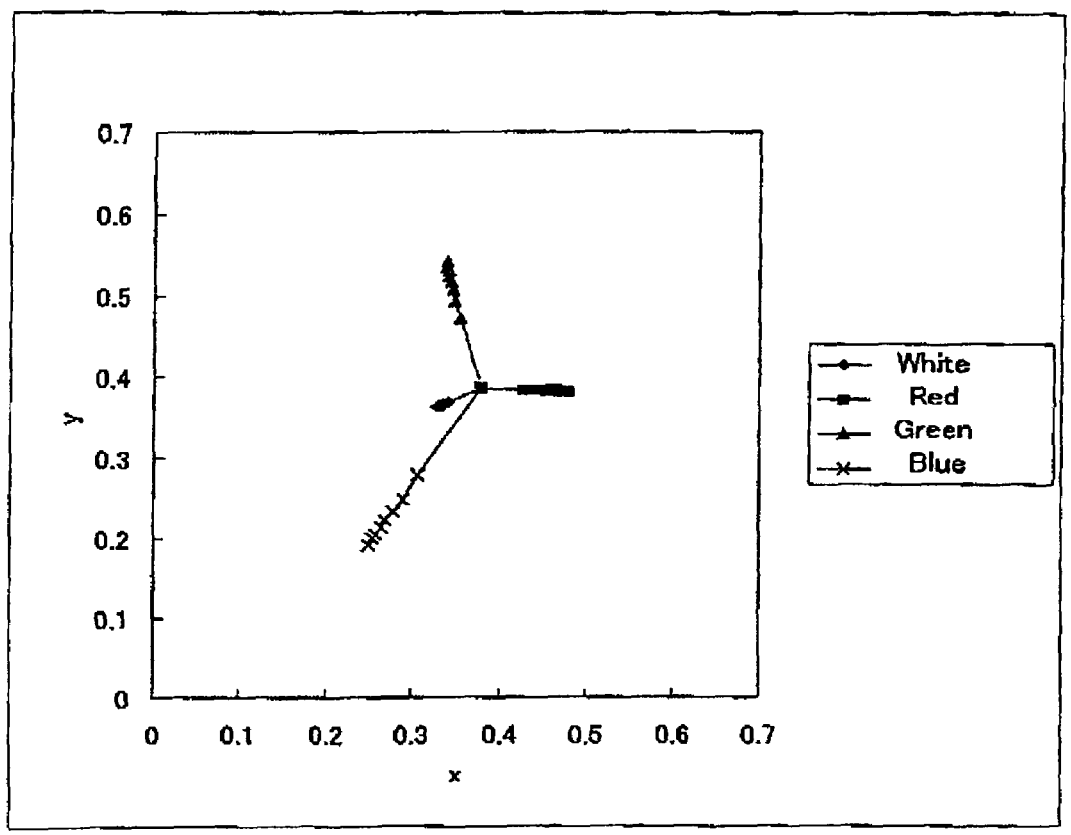
FIG. 12 shows variations in WRGB chromaticity when gray level is varied, expressed as an xy chromaticity diagram where the illuminance is approximately 600 lx and the $\gamma$ value of the projected image is 0.5.

The graph of FIG. 10 shows variations in WRGB chromaticity when gray level is varied, expressed as an xy chromaticity diagram where the illuminance is approximately 600 lux (lx) and the γ value of the projected image is 2.0, the graph of FIG. 11 shows those variations when the illuminance is approximately 600 lx and the γ value of the projected image is 1.0, and the graph of FIG. 12 shows those variations when the illuminance is approximately 600 lx and the γ value of the projected image is 0.5.

Figure 13:
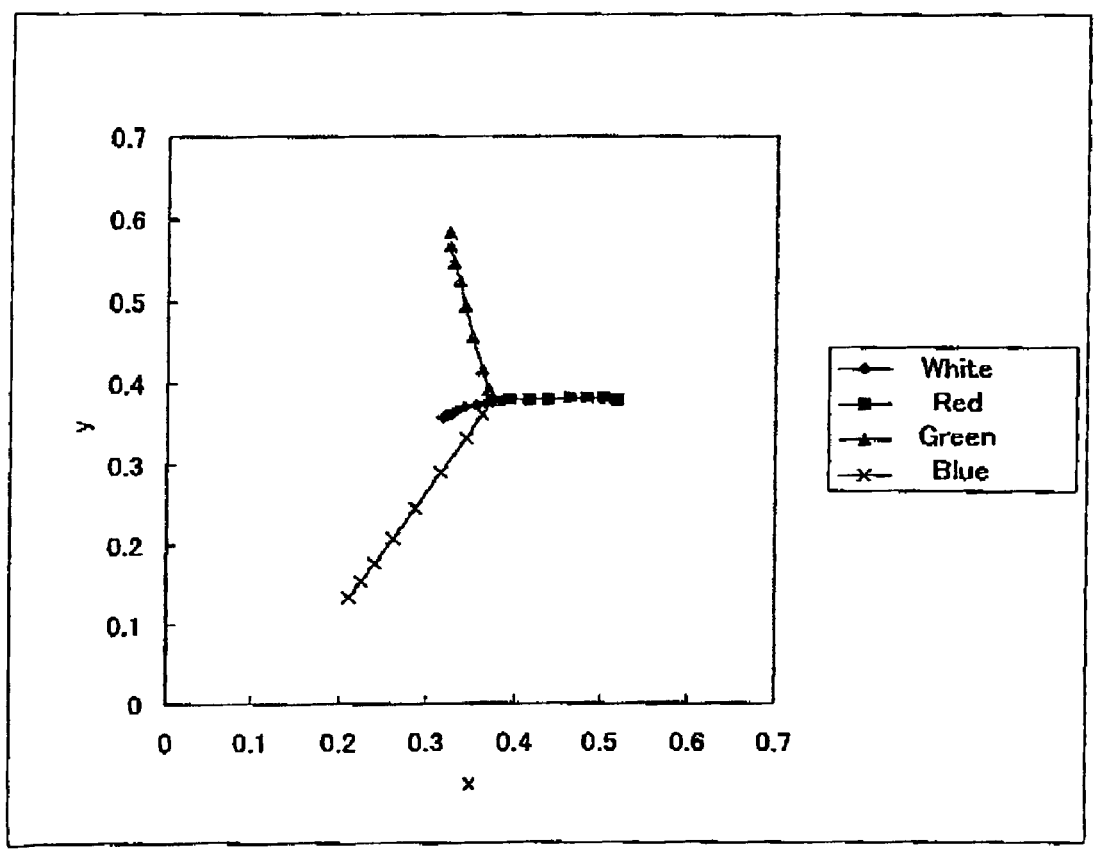
FIG. 13 shows variations in WRGB chromaticity when gray level is varied, expressed as an xy chromaticity diagram where the illuminance is approximately 300 lx and the γ value of the projected image is 2.0.
Figure 14:
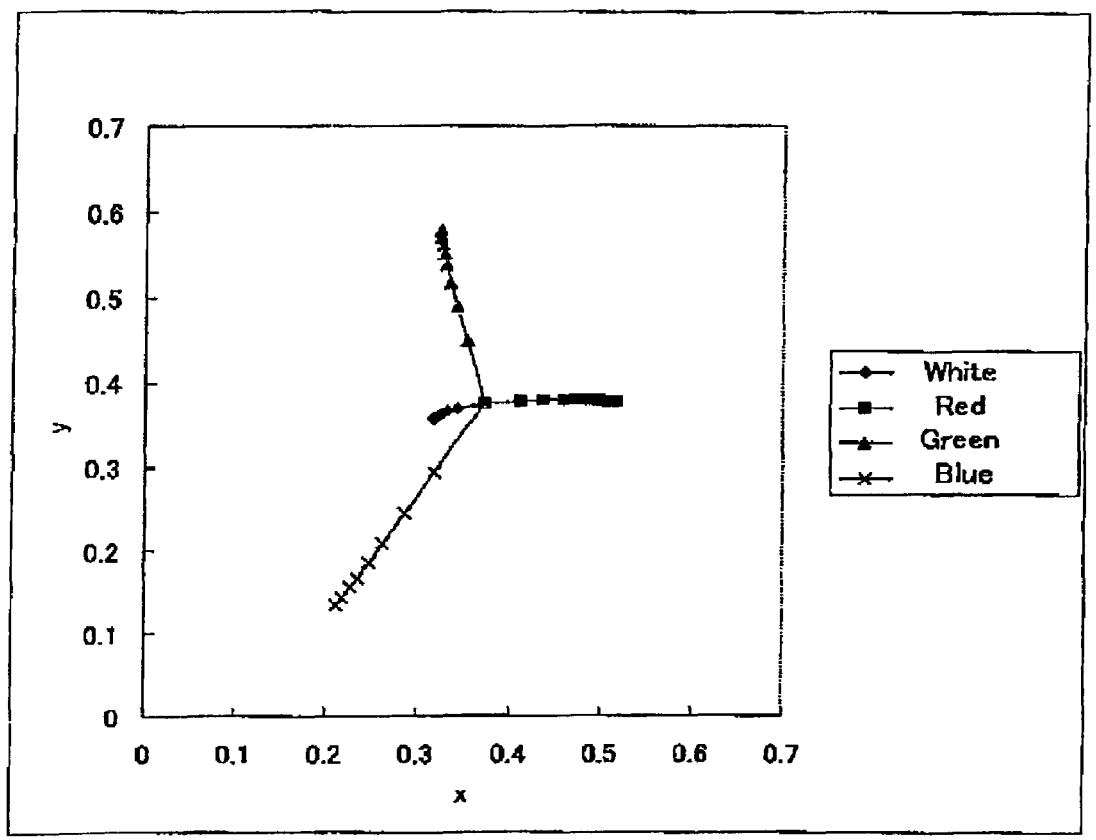
FIG. 14 shows variations in WRGB chromaticity when gray level is varied, expressed as an xy chromaticity diagram where the illuminance is approximately 300 lx and the γ value of the projected image is 1.0.
Figure 15:
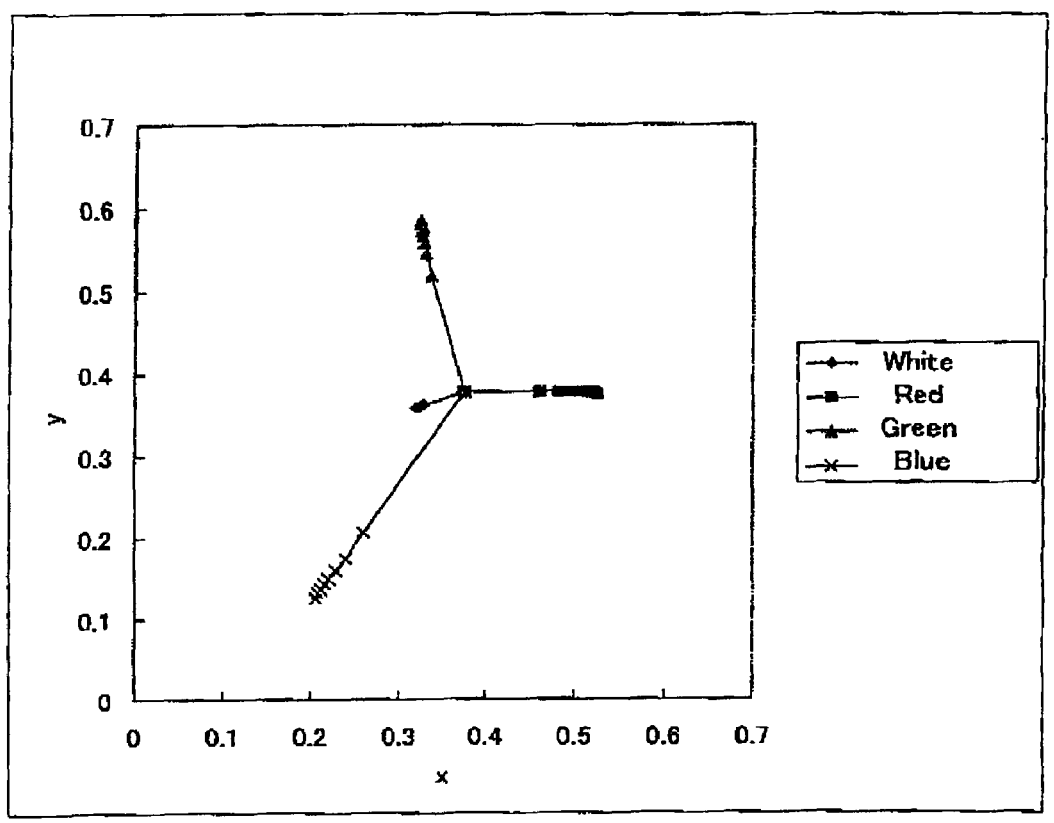
FIG. 15 shows variations in WRGB chromaticity when gray level is varied, expressed as an xy chromaticity diagram where the illuminance is approximately 300 lx and the γ value of the projected image is 0.5.

Similarly, the graph of FIG. 13 shows variations in WRGB chromaticity when gray level is varied, expressed as an xy chromaticity diagram where the illuminance is approximately 400 lx and the γ value of the projected image is 2.0, the graph of FIG. 14 shows those variations when the illuminance is approximately 300 lx and the γ value of the projected image is 1.0, and the graph of FIG. 15 shows those variations when the illuminance is approximately 300 lx and the γ value of the projected image is 0.5.

The WRGB chromaticity is positioned further outward as the gray level increases and approaches a point as the gray level decreases. The location of the point of approach is a white or gray area in the xy chromaticity diagram where the excitation purity (chroma) is low.

Under illumination, the projection light of the projector 20 and the artificial light are subjected to additive color mixing so that the excitation purity (chroma) of an image under illumination will deteriorate. The lower grayscale range of the image in particular has a low luminance from the projection light, so it is readily affected by the illumination and thus the chroma deterioration is likely to be large.

As can be seen from FIGS. 10 to 15, there is an effect by which the deterioration of the lower grayscale excitation purity (chroma) can be reduced by reducing the γ value even under illumination.

With the 300-lx illumination of FIGS. 13 to 15, the effect is increased with smaller values of γ value, in comparison with the 600-lx illumination of FIGS. 10 to 12. This is because the effect of artificial light in the additive color mixing is less with illumination of 300 lx. Thus the projector 20 can ameliorate the deterioration of the image in the lower grayscale range due to artificial light, by performing γ correction or grayscale characteristic correction in accordance with the brightness of the illumination.

Figure 16:
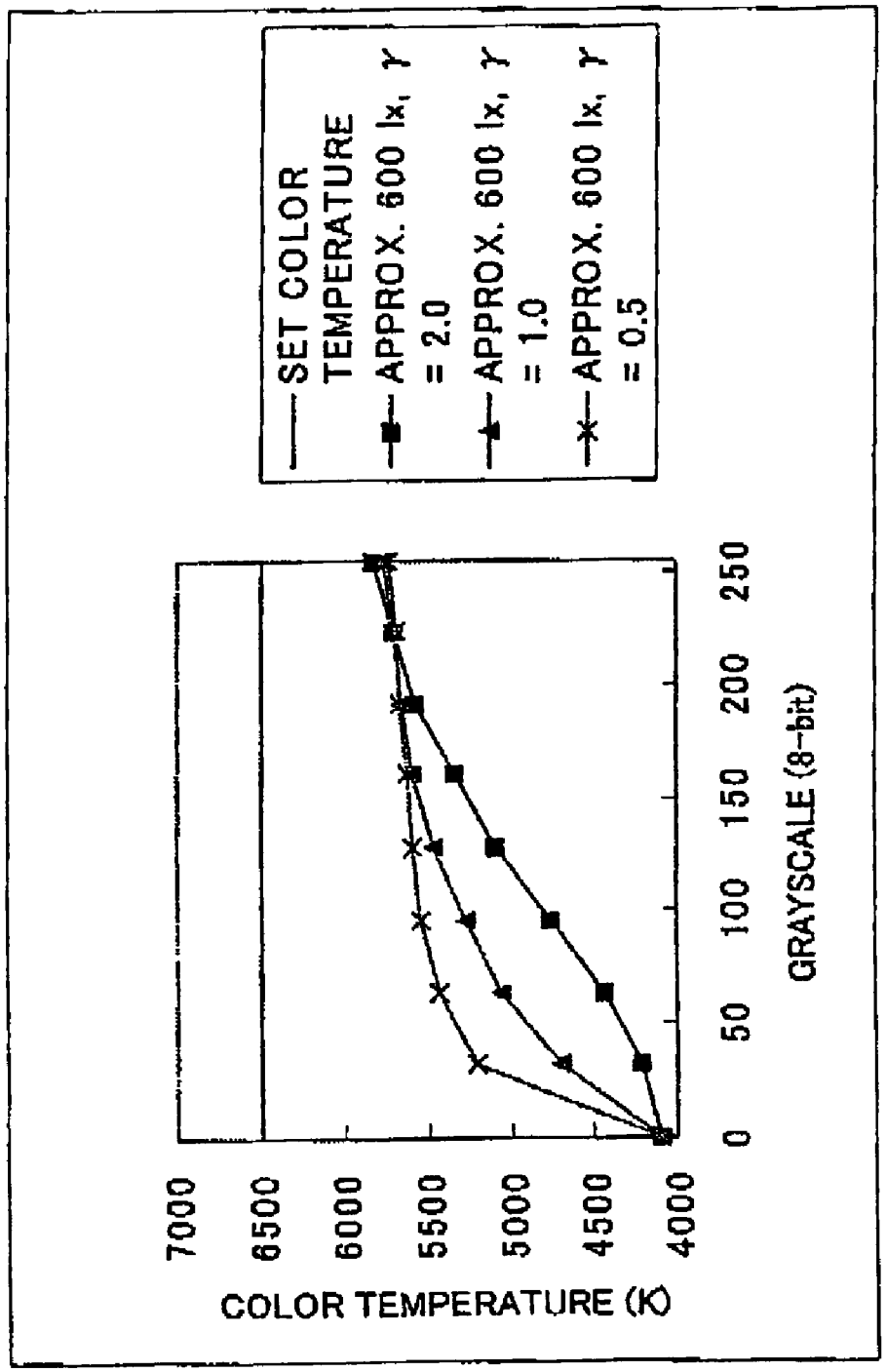
FIG. 16 shows variations in color temperature when gray level is varied, where the illuminance is approximately 600 lx and the γ value of the projected image is 2.0, 1.0, and 0.5.
Figure 17:
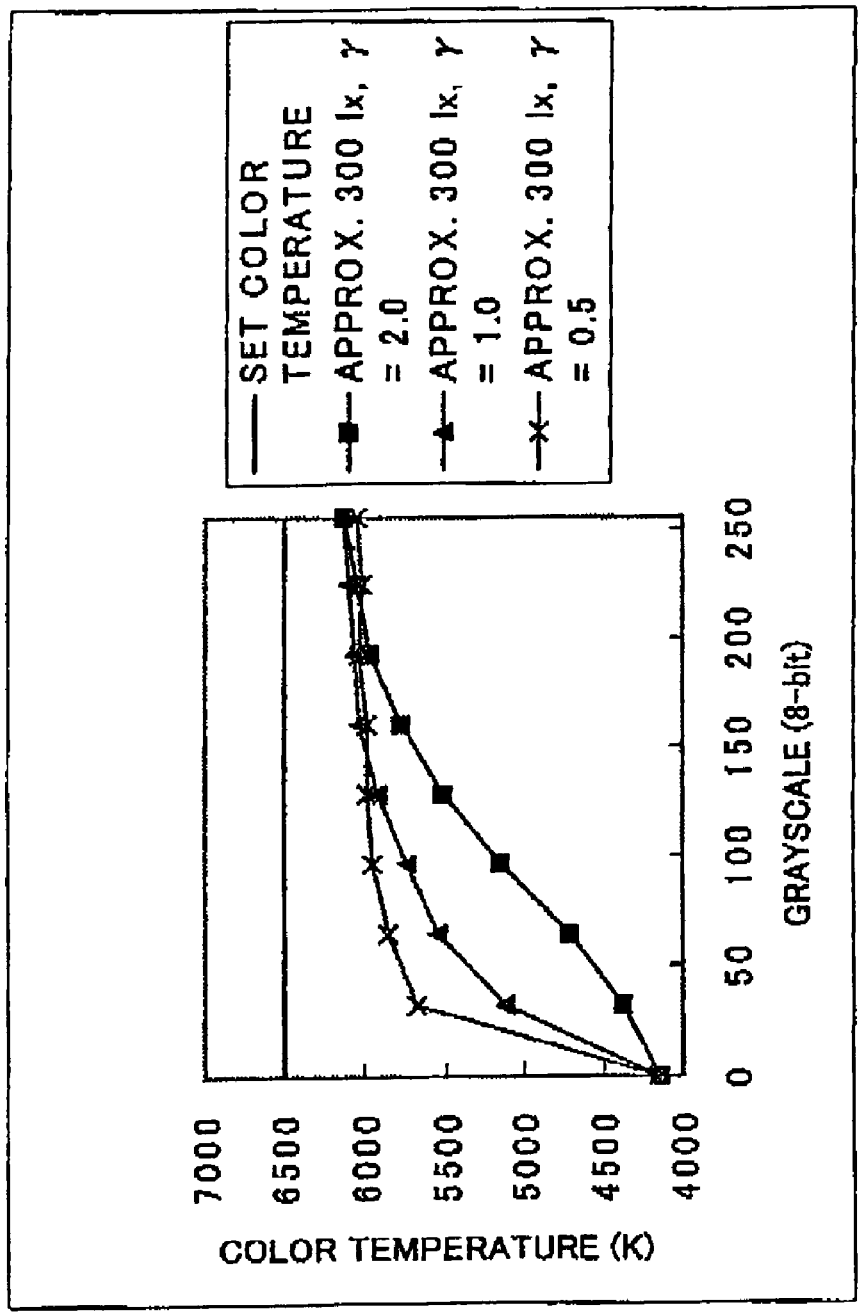
FIG. 17 shows variations in color temperature when gray level is varied, where the illuminance is approximately 300 lx and the γ value of the projected image is 2.0, 1.0, and 0.5.

The graph of FIG. 16 shows variations in color temperature when gray level is varied, where the illuminance is approximately 600 lx and the γ value of the projected image is 2.0, 1.0, and 0.5, and the graph of FIG. 17 shows those variations when the illuminance is approximately 300 lx and the γ value of the projected image is 2.0, 1.0, and 0.5. In this case, the set color temperature of the projector 20 itself is 6500K.

As can be seen from FIGS. 16 and 17, the color temperature stabilizes regardless of gray level variations when the γ value is small, at illumination intensities of both 600 lx and 300 lx. It should be noted, however, that the level of stabilization varies with the brightness of the illumination.

This is at approximately 5500K (γ=0.5) under 600-lx illumination whereas it is approximately 6000K (γ=0.5) under 300-lx illumination. Note that the illumination used in these experiments was provided by fluorescent lamps. The color temperature of the artificial light produced by fluorescent lamps is a little more than 4000K, giving a rather yellowish light.

The quantity of artificial light that is involved in the additive color mixing varies with the brightness of the artificial light. That is to say, different quantities of yellowish light (artificial light) are added to the image, depending on the brightness of the artificial light. As a result, when an image is affected by illumination, it is considered that the level at which the color temperature of the projected image stabilizes depends on the brightness of the artificial light, as shown in FIGS. 16 and 17.

This embodiment of the present invention makes it possible to make the color temperature of the reproduced image settle at 6500K by setting the color temperature of the projection light of the projector 20 to higher than 6500K, when under the illumination of fluorescent lamps.

As can also be seen from FIGS. 16 and 17, the level at which the color temperature of the image moves changes with the brightness of the illumination, so that the setting of the color temperature of the projection light (how far above the target color temperature to set it) depends on the brightness of the illumination.

With this embodiment of the present invention, the color temperature of the image reproduced under illumination can be stabilized for each gray level and also the image can be reproduced at the target color temperature, by using γ correction to cause the color temperature of the image under illumination to stabilize at a certain level, then correcting the color temperature of the depicted image in accordance with the brightness.

Description of Hardware

Note that the various means described below could be applied as hardware to be used in the previously described components.

Figure 19:
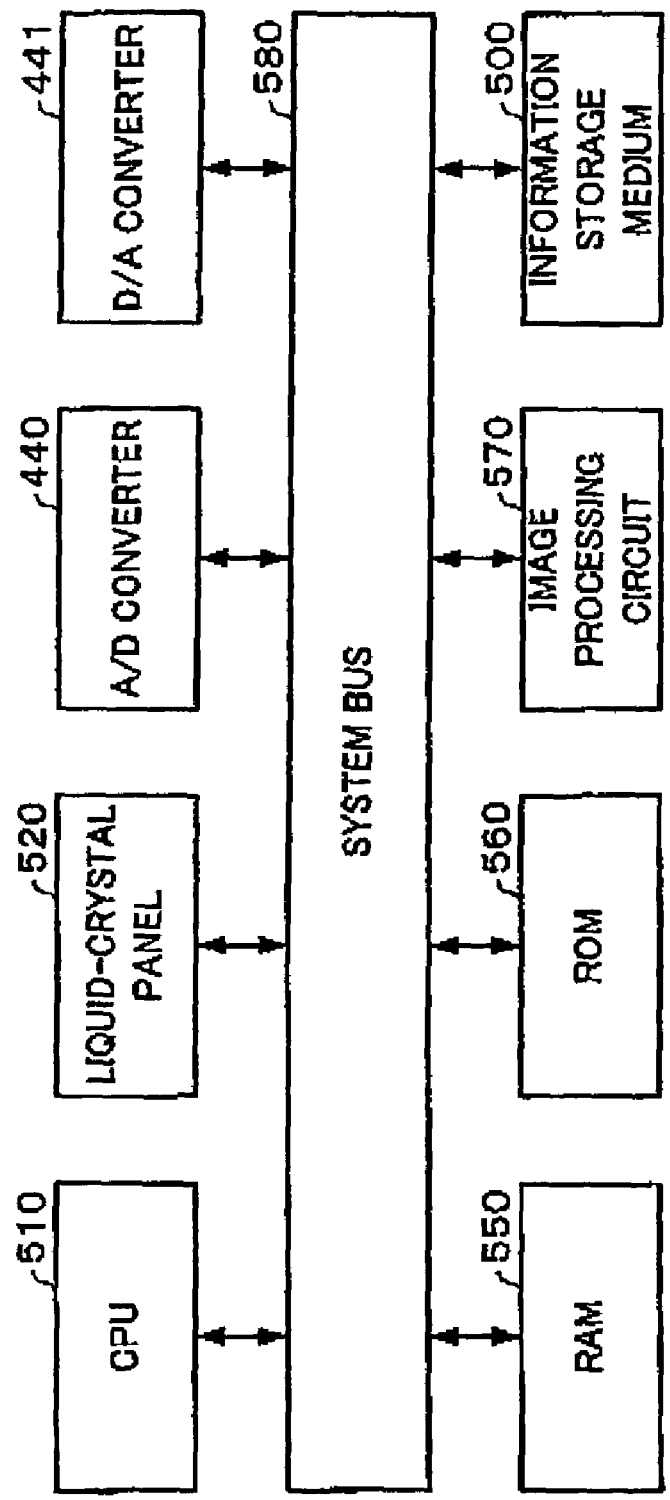
FIG. 19 is a block diagram showing hardware configuration of the image processing section in accordance with one embodiment of the present invention.

FIG. 19 is a block diagram showing hardware configuration of the image processing section in accordance with one embodiment of the present invention.

For example, the input signal processing section 401 could be implemented by using an A/D converter 440 or the like; the color control processing section 420 could be implemented by using RAM 550 or a CPU 510 or the like; the output signal processing section 405 could be implemented by using a D/A converter 441 or the like; the image display section 406 could be implemented by using a liquid-crystal panel 520, a ROM 560 storing a liquid-crystal light valve driver which drives the liquid-crystal panel 520 or the like, and the calibration section 430 could be implemented by using an image processing circuit 570 or the like. Information could be transferred between these components through a system bus 580. Note that these components could be implemented by hardware such as circuitry, or by software such as drivers.

The functions of these components could also be implemented by the reading of a program from an information storage medium 500. Means such as a CD-ROM, DVD-ROM. ROM, RAM, or hard disk can be used as the information storage medium 500, and either a direct method or an indirect method could be used for reading that information.

Instead of the information storage medium 500, it is also possible to implement the above described functions by downloading a program for implementing those functions from a host device or the like, through a transfer path.

The present invention has been described above with reference to an embodiment thereof, but the present invention is not limited to that embodiment.

Variations

If color compression and color expansion are not performed, by way of example, the function blocks can be simplified more than in FIG. 3.

Figure 4:
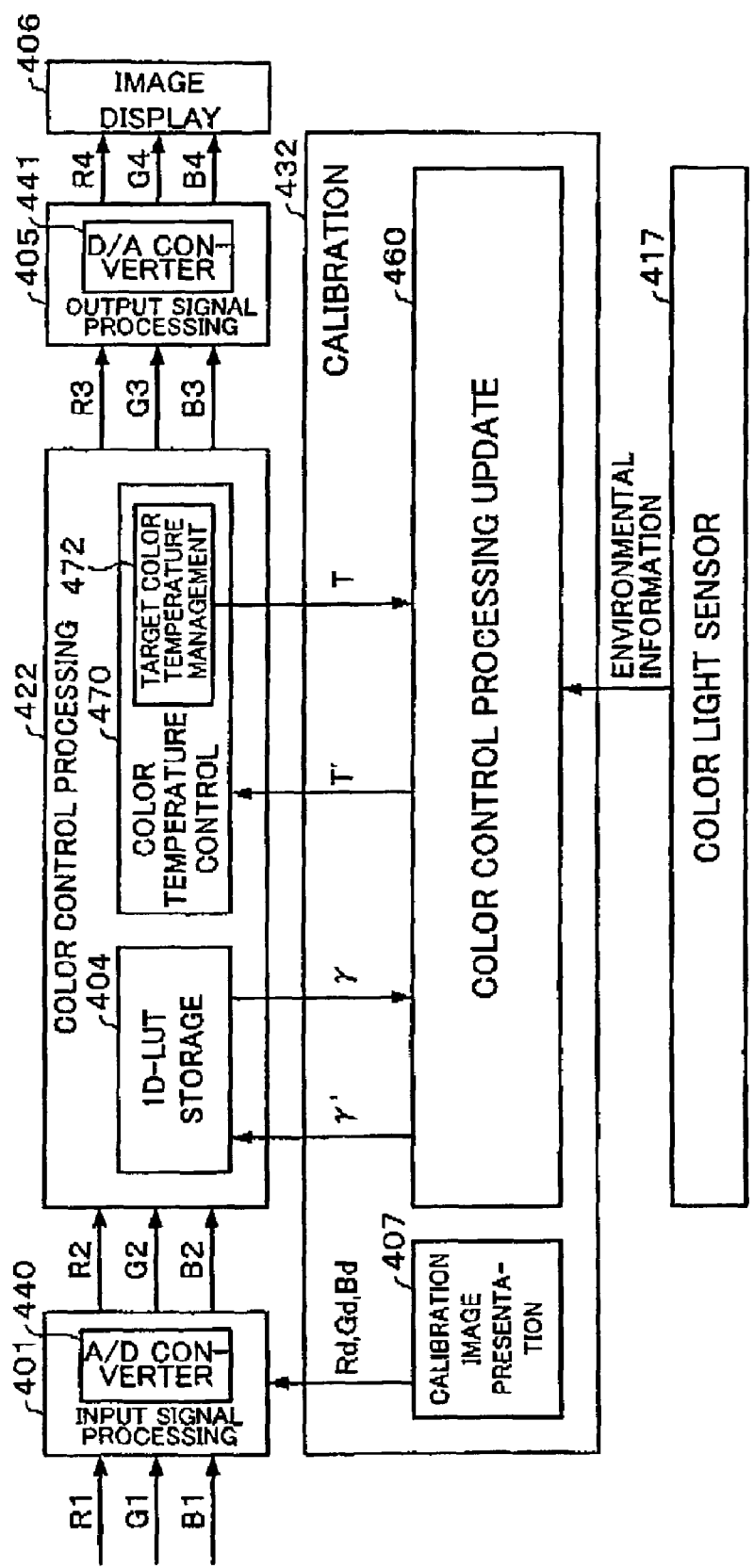
FIG. 4 is a functional block diagram of the image processing section within a projector in accordance with another embodiment of the present invention.

A functional block diagram of the image processing section within a projection in accordance with another embodiment of the present invention is shown in FIG. 4.

This image processing section does not have the 3D-LUT storage section 403, the color conversion section 408, the 3D-LUT storage section 409, and the post-correction 3D-LUT storage section 414 of FIG. 3, but instead a color temperature control section 470 is provided in a color control processing section 422 and the target color temperature management section 472 is provided as part of the color temperature control section 470.

The color control processing update section 460 provided in a calibration section 432 updates the target color temperature T from the target color temperature management section 472, based on the environmental information from the color light sensor 417, and outputs a target color temperature T' to the color temperature control section 470.

The color temperature control section 470 outputs to the output signal processing section 405 the colors of the image in such a manner as to achieve the target color temperature T' from consideration of the ambient light, as the corrected R3, G3, and B3 signals.

More specifically, note that a prior-art 1D-LUT it stored in the color temperature control section 470. In other words, the color correction in done with a 1D-LUT so that there are none of the effects achieved by the color compression and color expansion due to the previously described 3D-LUT, but the use of the color temperature control function provided in the prior art has the effect of enabling color correction without the addition of any new mechanism.

This makes it possible to configure a system that corrects for the effects of the environment in a simple manner, by providing the new 1D-LUT storage section 404 and managing a 1D-LUT for brightness correction.

In addition, suitable color reproduction can be achieved because the color temperature T is corrected in accordance with the brightness of the ambient light.

Note that the components of FIG. 3 are used for other functions so further description thereof is omitted.

In addition, the LUT stored in the previously described 1D-LUT storage section 404 could provide values that are scattered, such as in a mapping table form, or they could provide continuous values, such as those derived from functions, by way of example.

Note that if values are in a scattered form, such as in a mapping table, substantially continuous values (corresponding colors) can be obtained by interpolation using a method such as Lagrange interpolation or linear interpolation.

In the embodiment of the present invention described above, the color light sensor 417 was used as the viewing environment detection means by way of example, but an input means that inputs at least some part of the environmental information (such as the presence/absence of external light, the illumination type, or the screen type) or an image display means that displays an image for prompting the input of such details could be used therefor. Both the color light sensor 417 and an image for inputting screen type could be used together.

With a screen, in particular, it is easy for people to distinguish the type of the screen easily, so it is possible to display various types of screen for selection to enable reproduction of colors with reference to the screen type, by way of example, with little likelihood of a human decision error.

In this case, the viewing environment determined by the viewing environment detection means applies to factors such as ambient light (such as artificial light or natural light) and the object on which the image is displayed (such as a display, wall surface, or screen).

In particular, this embodiment of the present invention makes it possible to apply more appropriate image correction by obtaining information on a component that is not much considered in the prior art (i.e., the screen), thus enabling the reproduction of more uniform image colors.

Note that the screen 10 described above is of a reflective type, but it could equally well be of a transparent type. If the screen is of a transparent type, a sensor that scans the screen directly could be used as the color light sensor.

The determination of the viewing environment could be done automatically at fixed times, or it could be done in answer to human direction.

In the above-described embodiments, use is made of parameters that differ between two grayscale ranges, a lower grayscale range and a grayscale range that differs from the lower grayscale range, but the entire grayscale range could equally well be divided more finely (into three or more ranges, by way of example), and different parameters could be used for each of those grayscale ranges.

Similarly, the present invention can also be applied to presentations done by displaying images by a display means other than a projection means such as the previously described projector. Other than a liquid-crystal projector, a display device such as a cathode ray tube (CRT), a cathode ray tube (CRT) a plasma display panel (PDP), a field emission display (FED) device, an electro-luminescence (EL) device, or a direct-vision type of liquid crystal display device, or a projector using means such as a digital micromirror device (DMD) could be used as such a display means. Note that DMD is a trademark registered to Texas Instruments Inc. of the USA.

It should be obvious that the present invention would also be effective when displaying images in applications that are not presentations, such as in meetings, for medical treatment, in the design or fashion world, in business activities, and in education, as well as for general-purpose image displays such as movies, TV, video, and games.

If the input signals (R1, G1 and B1) are digital signals, the A/D converter section 440 would not be necessary, and if the output signals (R6, G6 and B6) are digital signals, the D/A converter section 441 would not be necessary either. This is preferably done as required in accordance with the input devices and output devices that are used.

Note that the functions of the previously described image processing section of the projector 20 could be implemented by a simple image display device (such as the projector 20), or they could be implemented by being distributed between a plurality of processing devices (such as processing that is distributed between the projector 20 and a PC).

In addition, the viewing environment detection means such as the color light sensor 417 and the image display system such as the projector 20 could be separate devices or they could be integrated into a single device.

In the above embodiment, information in xyY (or Yxy) form is used as color information comprising brightness information, but it could equally well be in another format such as Lab, Luv, or LCh.

The above described environmental information could also be values that express color and brightness in a form such as xyY, but it could also be color and brightness correction amounts in a form such as ΔxΔyΔY.

In addition, the embodiment described above related to application to a front-projection type of projector, but the present invention can equally well be applied to a rear-projection type of projector.

What is claimed is:

1. A projector comprising:
   an image display section that displays an image onto an object on which the image is displayed,
   a viewing environment detection section that detects a viewing environment including ambient light and the object on which the image is displayed, and generates environmental information expressing the viewing environment, and
   a correction section that corrects input-output characteristic data for display, the input-output characteristic data being used by the image display section, based on the environmental information,
   wherein the input-output characteristic data indicates output to a grayscale value of an input signal, and
   wherein the correction section corrects the input-output characteristic data in such a manner as to increase an output value in at least a lower grayscale range when the viewing environment is bright because of the effect of the ambient light.

2. The projector as defined in claim 1,
   wherein the viewing environment detection section includes a luminance sensor that measures a luminance value of a display area on which the image is displayed or a color light sensor that measures RGB or XYZ values of the display area.

3. The projector as defined in claim 1,
   wherein the correction section corrects the input-output characteristic data by performing a predetermined calculation based on a difference between a brightness value for an actual environment included in the environmental information and a brightness value for an ideal environment.

4. The projector as defined in claim 1,
   wherein the environmental information comprises environmental information for color correction and environmental information for brightness correction.

5. An image display system, which uses a projector, the image display system comprising:
   an image display section that displays an image onto an object on which the image is displayed,
   a viewing environment detection section that detects a viewing environment including ambient light and the object on which the image is displayed, and generates environmental information expressing the viewing environment, and
   a correction section that corrects input-output characteristic data for display that is used by the image display section, based on the environmental information,
   wherein the input-output characteristic data indicates output to a grayscale value of an input signal, and
   wherein the correction section corrects the input-output characteristic data in such a manner as to increase an output value in at least a lower grayscale range when the viewing environment is bright because of the effect of the ambient light.

6. The image display system as defined in claim 5,
   wherein the viewing environment detection section includes a luminance sensor that measures a luminance value of a display area on which the image is displayed or a color light sensor that measures RGB or XYZ values of the display area.

7. The image display system as defined in claim 5,
   wherein the correction section corrects the input-output characteristic data by performing a predetermined calculation based on a difference between a brightness value for an actual environment included in the environmental information and a brightness value for an ideal environment.

8. The image display system as defined in claim 5,
   wherein the environmental information comprises environmental information for color correction and environmental information for brightness correction.

* * * * *